US011461689B2

(12) United States Patent
Petursson

(10) Patent No.: US 11,461,689 B2
(45) Date of Patent: Oct. 4, 2022

(54) TECHNIQUES FOR AUTOMATICALLY TESTING/LEARNING THE BEHAVIOR OF A SYSTEM UNDER TEST (SUT)

(71) Applicant: Sigurdur Runar Petursson, San Jose, CA (US)

(72) Inventor: Sigurdur Runar Petursson, San Jose, CA (US)

( * ) Notice: Subject to any disclaimer, the term of this patent is extended or adjusted under 35 U.S.C. 154(b) by 838 days.

(21) Appl. No.: 15/399,942

(22) Filed: Jan. 6, 2017

(65) Prior Publication Data
US 2018/0197103 A1    Jul. 12, 2018

(51) Int. Cl.
G06N 20/00        (2019.01)
G06V 30/413       (2022.01)

(52) U.S. Cl.
CPC ........... *G06N 20/00* (2019.01); *G06V 30/413* (2022.01); *G06V 2201/02* (2022.01)

(58) Field of Classification Search
CPC ..................................................... G06N 20/00
See application file for complete search history.

(56) References Cited

U.S. PATENT DOCUMENTS

| 6,871,327 | B2 | 3/2005 | Polk |
| 8,214,805 | B2* | 7/2012 | Stewart ............... G06F 11/3664 715/762 |
| 8,671,389 | B1 | 3/2014 | Buryak et al. |
| 8,990,774 | B2* | 3/2015 | Amintafreshi ...... G06F 11/3692 717/124 |
| 9,098,635 | B2* | 8/2015 | Peri-Glass .......... G06F 11/3688 |
| 9,141,518 | B2* | 9/2015 | Bharadwaj ............ G06F 3/0481 |
| 9,600,401 | B1* | 3/2017 | Haischt ............... G06F 11/3664 |
| 10,402,039 | B2* | 9/2019 | Curtis .................... G06F 3/0481 |
| 2003/0126506 | A1* | 7/2003 | Lin ...................... G06F 11/3676 714/38.1 |
| 2006/0085681 | A1* | 4/2006 | Feldstein ............ G06F 11/3692 714/25 |
| 2006/0230319 | A1* | 10/2006 | Ryali .................. G06F 11/3684 714/38.14 |

(Continued)

OTHER PUBLICATIONS

Shehady et al., A Method to Automate User Interface Testing Using Variable Finite State Machines, 1997, 9 pages.*

(Continued)

*Primary Examiner* — Omar F Fernandez Rivas
*Assistant Examiner* — Tri T Nguyen
(74) *Attorney, Agent, or Firm* — Asif Ghias

(57) ABSTRACT

Techniques are disclosed for systems and methods for learning the behavior of and/or for performing automated testing of a system under test (SUT). The learning/testing is accomplished solely via the graphical user interface (GUI) of the SUT and requires no a priori metadata/knowledge about the GUI objects. The learning engine operates by performing actions on the GUI and by observing the results of these actions. If the actions result in a change in the screen/page of the GUI then a screenshot is taken for further processing. Objects are detected from the screenshot, new actions that need to be performed on the objects are guessed, those actions are performed, the results are observed and the process repeats. Text labels on the screens are also read and are used for generating contextualized inputs for the screens. The learning process continues until any predetermined learning/testing criteria are satisfied.

20 Claims, 8 Drawing Sheets

(56) References Cited

U.S. PATENT DOCUMENTS

| | | | | |
|---|---|---|---|---|
| 2007/0168971 | A1* | 7/2007 | Royzen | G06F 11/3688 |
| | | | | 717/124 |
| 2007/0234127 | A1* | 10/2007 | Nguyen | G06F 11/3696 |
| | | | | 714/38.1 |
| 2008/0086627 | A1* | 4/2008 | Splaine | G06F 11/3688 |
| | | | | 712/227 |
| 2010/0180260 | A1 | 7/2010 | Chikkadevaiah et al. | |
| 2011/0154109 | A1* | 6/2011 | Levine | G06F 8/70 |
| | | | | 714/26 |
| 2011/0231823 | A1* | 9/2011 | Fryc | G06F 11/3688 |
| | | | | 717/125 |
| 2014/0218385 | A1* | 8/2014 | Carmi | G06T 7/136 |
| | | | | 345/620 |
| 2015/0254169 | A1* | 9/2015 | Gillaspie | G06F 11/3692 |
| | | | | 714/38.1 |
| 2015/0339213 | A1* | 11/2015 | Lee | G06F 11/3664 |
| | | | | 717/125 |
| 2015/0370694 | A1* | 12/2015 | Zhang | G06F 11/3688 |
| | | | | 717/124 |
| 2016/0179658 | A1* | 6/2016 | Avery | G06F 3/0481 |
| | | | | 717/135 |

OTHER PUBLICATIONS

Amalfitano, Domenico et al., "Using GUI Ripping for Automated Testing of Android Applications", ASE '12 Proceedings, Essen Germany (ACM), Sep. 3-7, 2012, pp. 258-261.

Anam, Rajibul et al., "Hidden Object Detection for Computer Vision Based Test Automation System", WSEAS Transactions on Computers, vol. 14, Jun. 2015, pp. 570-579.

Byooki, Seyed Ali Moosavi, "Component-Based Crawling of Complex Rich Internet Applications", Master of Computer Science Thesis, School of Electrical Engineering and Computer Science, University of Ottawa, 2014, 112 pgs.

Chang, Tsung-Hsiang et al., "GUI Testing Using Computer Vision", MIT Open Access Articles, Proceedings of the 28th International Conference on Human Factors in Computing Systems, ACM, New York, NY, USA, Apr. 10-15, 2010, pp. 1535-1544.

Dixon, Morgan et al., "Content and Hierarchy in Pixel-Based Methods for Reverse Engineering Interface Structure", CHI 2011, ACM, May 7-12, 2011, Vancouver, BC, Canada, 10 pgs.

Jung, Hyunjun et al., "An Image Comparing-based GUI Software Testing Automation System", Proceedings of the International Conference on Software Engineering Research and Practice (SERP), Jul. 16, 2012, pp. 1, Athens, Greece.

Mesbah, Ali et al., "Invariant-Based Automatic Testing of AJAX User Interfaces", Proceedings of the 31st International Conference on Software Engineering (ICSE'09), IEEE Computer Society, May 16, 2009, 16 pgs.

Okada, Hidehiko et al., "GUI Navigator/Cover: GUI Transformation Systems for PC Novice Users", Internet Systems Research Laboratories, NEC Corporation, Japan, Sep. 1, 2003, 5 pgs.

Sikuli, Sikuli Script Home Page, http://www.sikuli.org/, Oct. 21, 2016, 4 pgs.

Sikuli, SikuliX—the basics—SikuliX 1.1 + documentation, http://sikulix-2014.readthedocs.io/en/latest/basicinfo.html, Oct. 21, 2016, 8 pgs.

Stocco, Andrea et al., "PESTO: A Tool for Migrating DOM-based to Visual Web Tests", DIBRIS Universita di Genova, Italy, IEEE 2014, Sep. 28, 2014, 7 pgs.

Sturgill, Margaret et al., "A Proofing, Templating and Purposing Engine in Java and C#/.NET", HP Laboratories Palo Alto, ACM Symposium on Documentation Engineering, Nov. 20-22, 2003, Grenoble, France, 23 pgs.

Taheri, Seyed M. Mir, "Distributed Crawling of Rich Internet Applications", PhD Thesis in Computer Science, School of Electrical Engineering and Computer Science, University of Ottawa, Canada, 2015, 181 pgs.

Vos, Tanja E.J. et al., "TESTAR: Tool Support for Test Automation at the User Interface Level", International Journal of Information System Modeling and Design (IJISMD), Jul. 1, 2015, pp. 46-83, vol. 6(3).

Yang, Wei et al., "A Grey-box Approach for Automated GUI-Model Generation of Mobile Applications", 16th International Conference on Fundamental Approaches to Software Engineering (FASE), Mar. 16, 2013, pp. 250-265, vol. 7793, Berlin, Germany.

* cited by examiner

TECHNIQUES FOR AUTOMATICALLY TESTING/LEARNING THE BEHAVIOR OF A SYSTEM UNDER TEST (SUT)

FIELD OF THE INVENTION

This invention relates generally to computer testing automation and specifically to techniques related to dynamically learning the behavior of and/or testing another computer system under test (SUT).

BACKGROUND ART

Quality Assurance (QA) of computer systems, including software and hardware, is an active area of industrial and academic pursuit. The demand for excellence in the quality of computer products is at an all-time high due to the downstream consequences of coding flaws or bugs. These flaws/bugs can have devastating consequences for businesses and their stakeholders. To name just a few, these include the introduction of cybersecurity vulnerabilities in the systems, incurring of financial or transactional errors/losses, operational issues leading to product recalls, compromise of patient care, airline safety issues, etc.

In order to improve software quality, there is a strong desire to make the QA processes more robust and automated. There are a number of prior art techniques, some including computer vision, that try to address this desire. Non-Patent Literature (NPL) reference "GUI Testing Using Computer Vision" by Chang et al., dated 2010, teaches that testing the visual behavior of a Graphical User Interface (GUI) typically requires human testers to interact with the GUI and to observe whether the results of the interaction are as expected. Their paper presents an approach to GUI testing using computer vision for testers to automate their tasks. Testers can write a visual test script that uses images to specify which GUI components to interact with and what visual feedback to expect. Testers can also generate visual test scripts by demonstration. By recording both input events and screen images, it is possible to extract the images of components interacted with and the visual feedback seen by the demonstrator, and to generate a visual test script automatically. They purportedly show that a variety of GUI behavior can be tested using their approach. They also purportedly show how their approach can facilitate good testing practices such as unit testing, regression testing, and test-driven development.

NPL reference "Hidden Object Detection for Computer Vision Based Test Automation System" by Anam et al., dated June 2015, teaches that computer vision based automation tools used to test windows based application contain many type of objects like buttons, boxes, lists, etc. Automation tools detect these objects by comparing images. While most of the objects are visible on the screen, some are not visible the first time. They report that with vision based automation systems these hidden objects cannot be searched directly. Therefore, they propose methods that use images and shortcut keys to interact with the testing software to search for the hidden objects. Their methods purportedly enhance the automation tools to access the hidden objects faster.

NPL reference "Content and Hierarchy in Pixel-Based Methods for Reverse Engineering Interface Structure" by Dixon et al., dated 2011 presents methods for hierarchical models of complex widgets, real-time interpretation of interface content, and real-time interpretation of content and hierarchy throughout an entire interface. The authors validate their methods through implementations of four applications: stencil-based tutorials, ephemeral adaptation, interface translation, and end-user interface customization. They also demonstrate these enhancements in complex existing applications created from different user interface toolkits running on different operating systems.

Thesis entitled "Component-Based Crawling of Complex Rich Internet Applications" by Byooki of University of Ottawa, dated 2014 addresses the challenge of efficiently crawling complex Rich Internet Applications (RIAs) with two main ideas: component-based crawling and similarity detection. His experimental results purportedly show that these ideas lead to a drastic reduction of the time required to produce results, enabling the crawler to explore RIAs previously too complex for automated crawl. Another thesis entitled "Distributed Crawling of Rich Internet Applications" by Taheri also of University of Ottawa, dated 2015, explores the effect of making different tradeoffs and their effect on the time it takes to crawl RIAs.

This thesis studies the cost of running a distributed RIA crawl with client-server architecture and compares it with a peer-to-peer architecture. It further studies distribution of different crawling strategies, namely: Breath-First search, Depth-First search, Greedy algorithm, and Probabilistic algorithm. To measure the effect of different design decisions in practice, a prototype of each algorithm was implemented. The implemented prototypes were used to obtain empirical performance measurements and to refine the algorithms. The ultimate refined algorithm was used for experimentation with a wide range of applications under different circumstances. The thesis finally includes two theoretical studies of load balancing algorithms and distributed component-based crawling.

NPL reference, "GUI Navigator/Cover: GUI Transformation Systems for PC Novice Users" by Okada et al. dated September 2003 proposes two systems for transforming the graphical user interfaces (GUIs) of PC applications to enable novice users to use the applications without pre-learning. The essence of their systems is to read GUI screens by using a GUI accessibility method. One system can externally add user-application navigation to application GUIs. The other can replace application GUI screens with more simply designed screens. The effectiveness of their systems was purportedly confirmed by an evaluation with actual PC novices.

Another NPL reference, "An Image Comparing-based GUI Software Testing Automation System" by Jung et al., dated August 2016, proposes an automated GUI (Graphical User Interface) testing method to support regression testing when a company requests new functionality additions or program changes during the development phase. In their paper, they propose an automated GUI testing method based on two processes. An event-driven testing method can test the target program directly. A capture and replay testing method can repeat recordings of the tester's actions. GUI verification is image comparing-based. To demonstrate the advantages of their proposed method, they implemented a prototype system based on C#.

U.S. Pat. No. 8,671,389 to Buryak et al. teaches that applications can be localized by a localization expert to allow them to be used by a broader customer base. The localization can be conducted by a localization expert who is provided with a resource file containing localizable components. The resource file can be generated by providing a developer with one or more text strings based on the development code of the application and then receiving the localizable components. The components are selected from the text strings based on the development code. Furthermore, the tool called Sikuli uses image recognition to identify and control GUI components. The tool may be useful when there is no easy access to the GUI's source code.

All the prior art techniques require that the metadata of the screen elements or objects be already hardcoded or available in some fashion. The metadata could be descriptors of the object or a full screenshot that is then searched for. Furthermore, they require explicit steps by the user on what should be done for testing.

More specifically, the prior art techniques can be categorized as follows:

A. For browser based testing, Document Object Model (DOM) is generally employed to understand the behavior of the GUI elements/objects in an a priori fashion.
B. For application testing, software hooks are used to create context for the GUI elements/objects, otherwise prior metadata knowledge for the objects is provided.
C. Purely visual prior art approaches either use images of the GUI objects to detect where they are located, or they use the pixel patterns of the objects on the screen.

Therefore, a key shortcoming of the prior art techniques is that they all require that the automation software have a priori knowledge of how the software is constructed internally. The knowledge varies between approaches, whether it be a DOM model of the application, images of GUI objects/elements or pixel patterns. None of the techniques can start from zero prior knowledge or metadata of the GUI objects, and generate this metadata on the fly while they learn the behavior of the system under test (SUT).

Another shortcoming of the prior art techniques is that they cannot be used to dynamically learning the behavior of the SUT in either a fully automated fashion, or an automated fashion while utilizing minimally supervised learning. Yet another shortcoming of the prior art teachings is that they do not allow for detecting screen objects that may be of any shape, without requiring prior metadata about those objects.

OBJECTS OF THE INVENTION

In view of the shortcomings of the prior art, it is an object of the present invention to provide a system and methods for learning the behavior of a SUT on the fly without requiring a prior metadata about its GUI objects and their behavior.

It is another object of the invention to provide techniques for testing a SUT in a fully automated or unmanned manner solely via its GUI.

It is still another object of the invention to provide techniques for automated testing of the SUT with supervised learning.

It is still another object of the invention to detect screen objects of the SUT that may be of any shape.

Still other objects and advantages of the invention will become apparent upon reading the detailed description in conjunction with the drawing figures.

SUMMARY OF THE INVENTION

The objects and advantages of the invention are secured by a learning engine and methods for testing or learning the behavior of another computer system under test (SUT). The learning engine learns the behavior of the SUT entirely from a graphical user interface or GUI of the SUT. The learning requires no prior knowledge or metadata about the objects on the screens of the GUI. The learning engine employs techniques of supervised and unsupervised machine learning to accomplish its objectives. It is preferably deployed in a Quality Assurance (QA) setting to perform a fully or semi-automated exhaustive or partial testing of the SUT.

The learning engine of the present technology preferably operates in a client-server model. It begins by taking a screenshot of the GUI of the SUT, and then detecting objects on the screen from the screenshot. For the initial detection of screen objects, the learning engine employs any number of the available edge and/or contour detection algorithms, whether they are off the shelf, or user supplied. These algorithms preferably include a Canny edge detection algorithm. If there are more than one algorithms employed for detecting objects, it is conceivable that an object may be detected more than one times, or in other words, have duplicates. Therefore, a Deduplication module exists which is responsible for identifying the duplicates using a similarity computation.

A key aspect of the system for achieving efficiency is that it keeps a central data structure or construct for storing the information about each type of object. This central construct is called Unique Objects. Once an object is detected on the screen, and it undergoes deduplication, it is made to refer to its Unique Object. The above mentioned similarity computation of the deduplication function ensures that the screen object is similar to the Unique Object by a high level of likelihood, preferably at least 99%.

In order to gain knowledge about the screen objects, the learning engine performs various actions on the objects, and observes their results. These actions are simulated by the engine on the GUI of the SUT, as if they were being performed by a human user or a testing/automation script. With each iteration of the engine as more actions are performed on the objects, the learning engine learns more about each object, until a predetermined knowledge or "learning" criterion is satisfied.

Preferably, the learning engine employs the techniques of supervised and unsupervised machine learning to achieve its objectives. There is an object-type associated with each screen object that is stored in its corresponding Unique Object. The object-type defines what kind of a screen object it is. Preferably, the object-types include a button, an input-box, a dropdown, a radio button, a label, an image, a canvas, a drag-&-drop, a hyperlink, a scrollbar, a slider, and the like. The object-type of each screen object is determined as the learning engine performs its various functions in an iterative fashion. For this purpose, the learning engine employs a Guesser module, an Action Sugguester module, an Object Grouper module and an Input Generator module working in conjunction with still other functions or modules of the system.

A key aspect of the design is the use of an Action Array construct or data structure. Action Array is used to carry the actions to be performed or simulated on the GUI of the SUT. It is also used to store the results of those actions as well as the latest screenshot of the GUI. This information in Action Array is then passed on to various modules of the system for processing. Such a facility is preferably used in the client-server model based operation of the system. That is because Action Array carries the actions to the client, which then performs those actions and stores the results of the actions as well the latest screenshot. It then sends Action Array to the server for backend processing. The server can then add further actions to Action Array, send it back to the client, and this cycle can repeat until the required testing of the SUT has been accomplished or a learning criterion of its behavior has been satisfied.

The screenshots thus taken of the GUI are preferably stored as pages in a state transition model or Application Map of the SUT. The Application Map is preferably maintained by an Application Mapping module. To perform its comparison of the new screenshots with the pages already existing in the Application Map, a Sub-screen Similarity functionality is preferably employed by the Application Mapping module. This functionality allows for comparing only a portion of the screens in order to determine whether they are the same/similar or not.

The Application Map, Action Array, Unique Objects and other requisite entities are preferably stored in a database or datastore. The datastore can be implemented using any suitable technology available in the art, including data warehouse(s), data mart(s), Big Data cluster(s), File System(s), In-Memory database(s), Object database(s), or the like.

An advantageous embodiment contains an Object Grouper module, which is in charge of identifying whether multiple objects on the screen form a logical set or object group. Examples, of an object group includes, a form, a radio button and accompanying label, an input-box and its label, and other like object combinations. Object Grouper accomplishes its objectives by executing a label proximity logic. The label proximity logic locates and interprets the label nearest to an object. Based on this label, the system assigns a context to the object.

Then based on the context, an Input Generator module is preferably employed. The Input Generator module generates various inputs for the system. These inputs are randomly generated either by looking up predefined input datasets, or using regular expression based input generation logic according to the context of the object.

In this fashion, the Input Generator module can be used to apply inputs to the SUT as the learning engine tests the SUT or learns its behavior. This process can repeat in an unmanned or automated fashion until the learning or testing objectives for the SUT have been accomplished. Such objectives may include either partial or exhausting learning/testing of the SUT. In a semi-automated embodiment, user inputs may also be provided in the learning process in a supervised learning manner.

Clearly, the system and methods of the invention find many advantageous embodiments. The details of the invention, including its preferred embodiments, are presented in the below detailed description with reference to the appended drawing figures.

BRIEF DESCRIPTION OF THE DRAWING FIGURES

Figure 3:
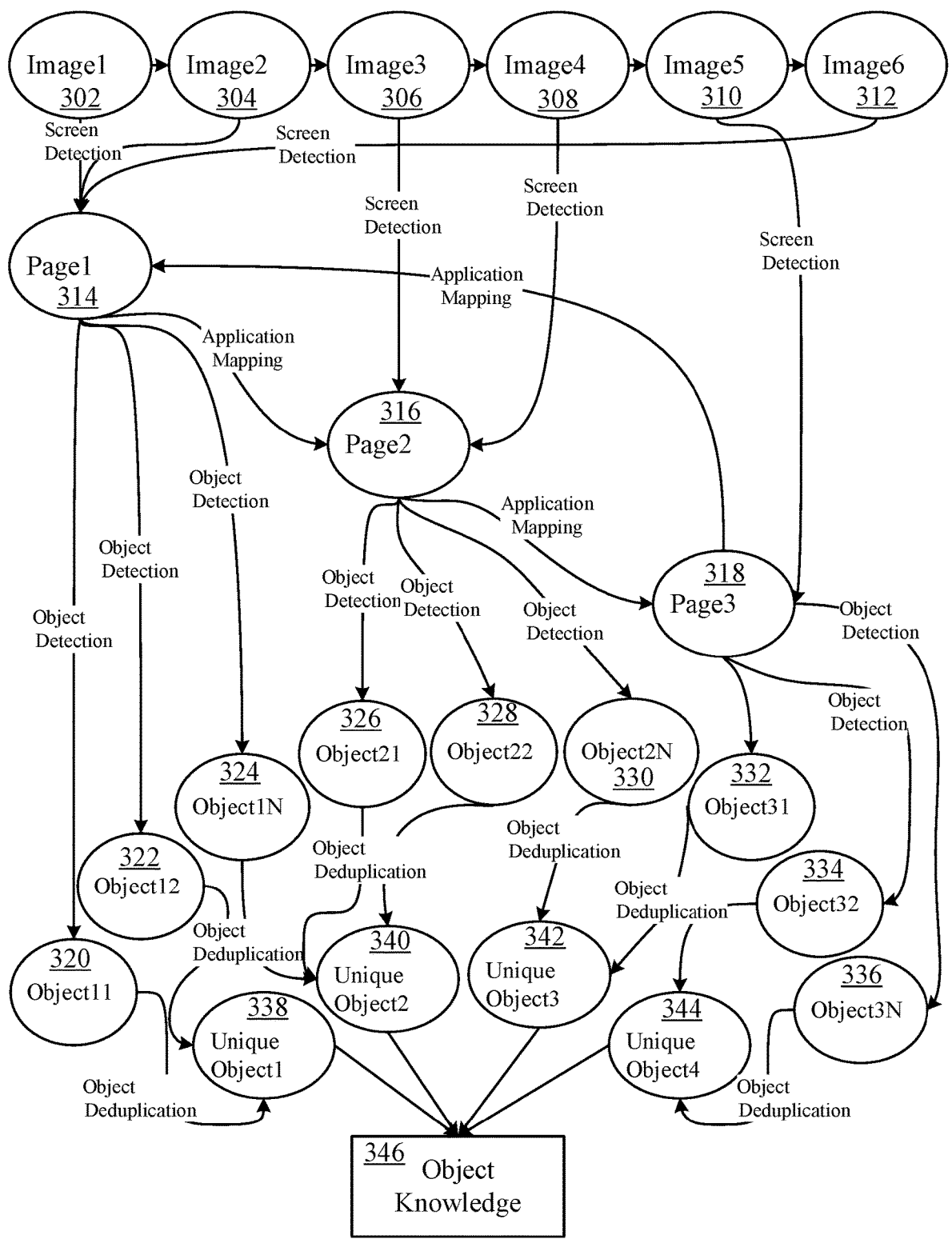

FIG. 3 is a graph illustrating how various screenshots/images get inserted into the state transition model or Application Map of the SUT. The graph also illustrates the relationships between the various screens/pages in the Application Map. The figure also shows that various objects associated with the pages in the Application Map correspond to their respective Unique Objects.

Figure 4:
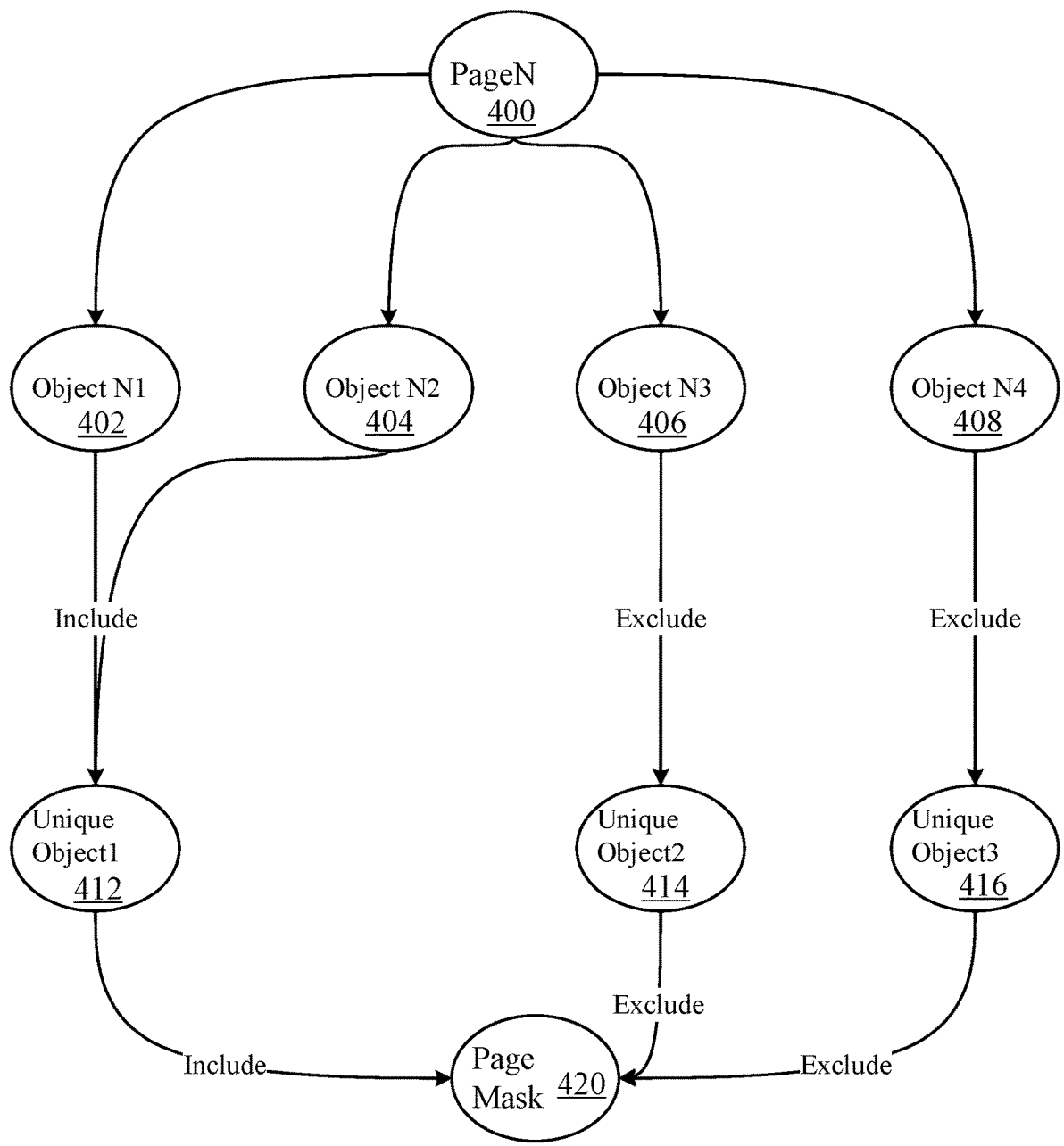

FIG. 4 is a graph illustrating the inclusion of certain objects and the exclusion of others from a comparison mask that is used in the Sub-screen Similarity functionality of the learning/testing engine.

Figure 5:
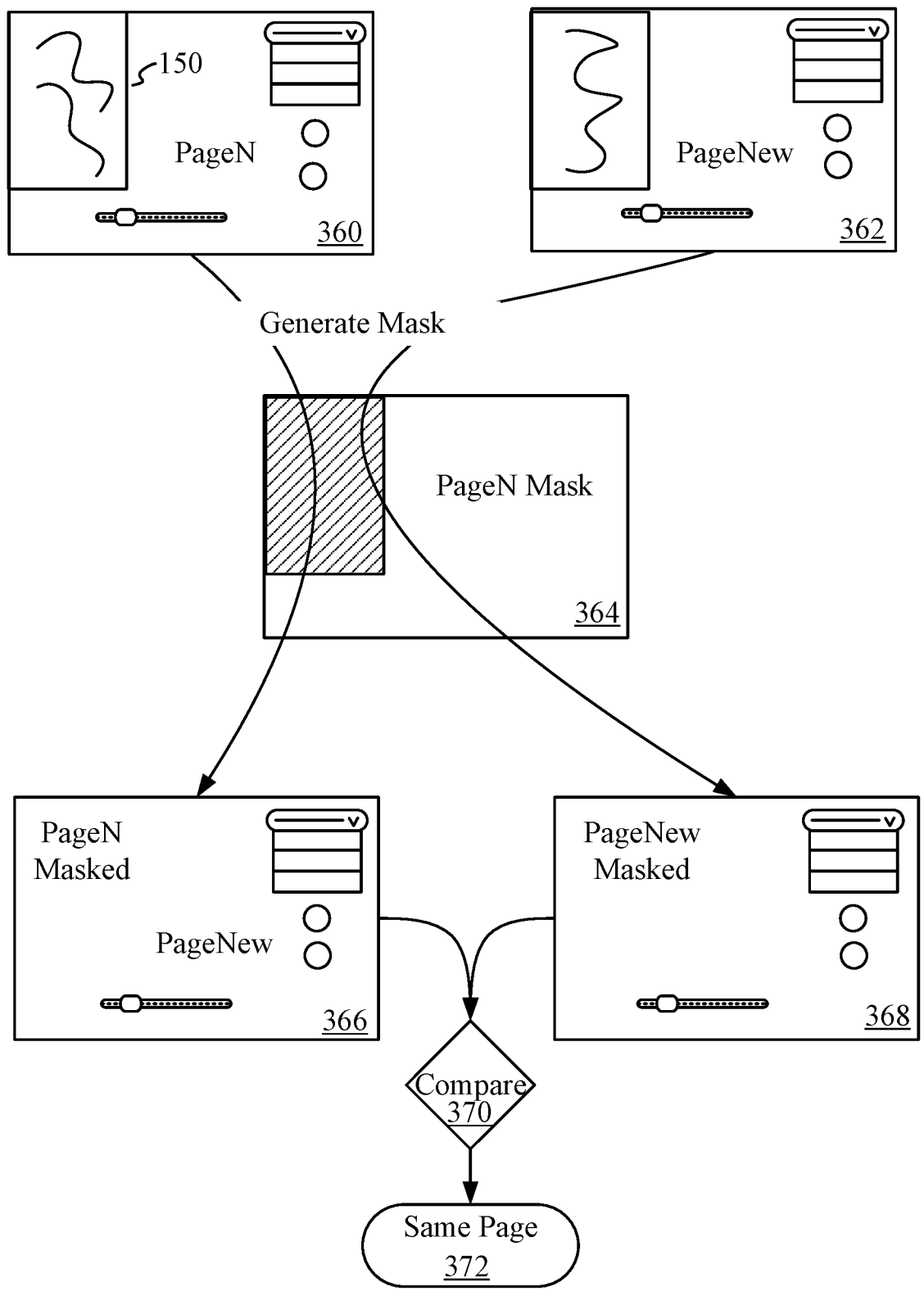

FIG. 5 illustrates in a block-diagram fashion, the Sub-screen Similarity functionality/capability and the use of the comparison mask.

Figure 6:
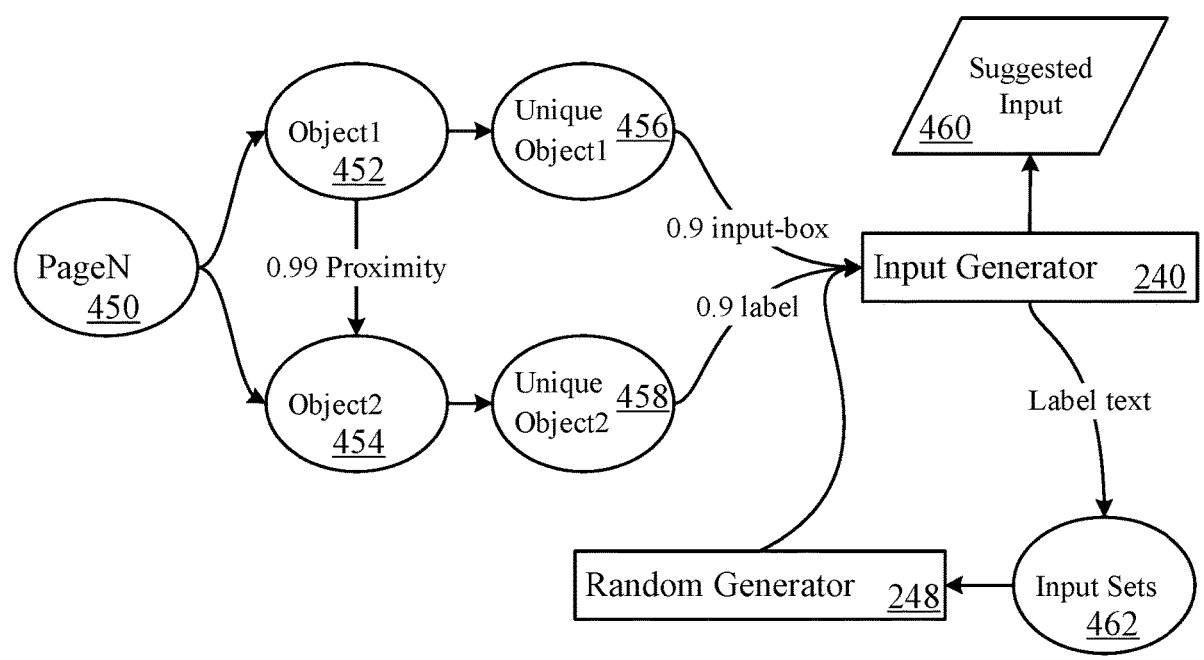

FIG. 6 shows how the label proximity logic is used to determine the proximity relationship between two objects, and how this relationship is provided to the Input Generator module.

Figure 7:
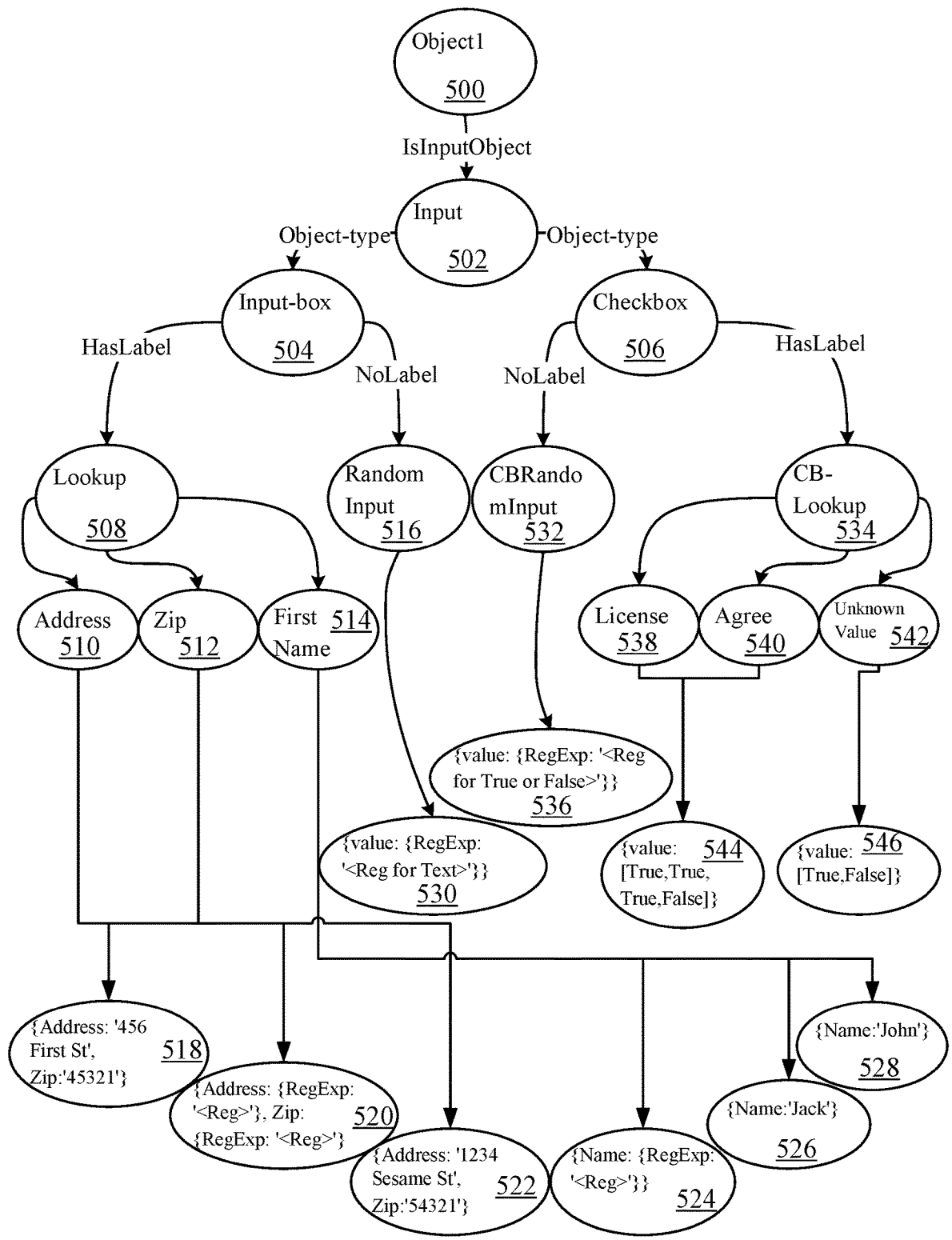

FIG. 7 shows an expansion graph for two types of input objects, an input-box and a checkbox. The graph also shows how the presence/absence of labels of these objects is used for generating contextualized inputs for these objects.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1A:
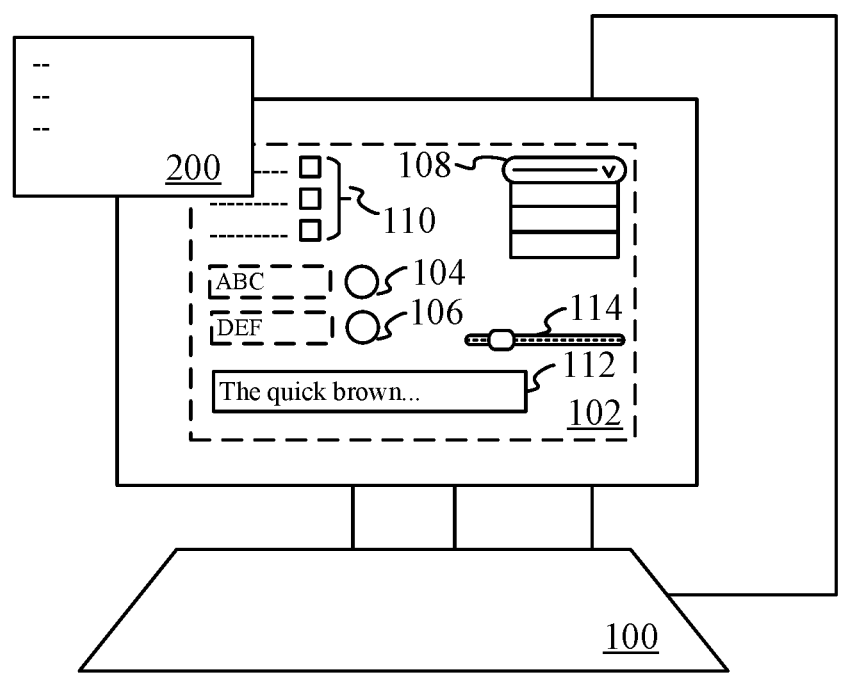
FIG. 1A is the conceptual diagram of a learning/testing engine operating on a system under test (SUT) according to the invention.

The present invention will be best understood by first reviewing a computer system behavior learning engine 200 according to the present teachings as illustrated in FIG. 1A. Learning engine 200 which is based on a computer program learns the behavior of a system under test (SUT) 100 from its graphical user interface (GUI) 102 according to the techniques disclosed herein. SUT 100 may be a software application, a hardware system, or a combination of hardware and software. In this disclosure, we will refer to the application or system whose behavior is being learned, by the term SUT standing for system under test. The present teachings are highly applicable for automatically testing SUT 100 for quality assurance (QA) purposes or for automatically learning its behavior for any number of reasons.

We may refer to the main embodiments as a computer learning engine or more simply as a learning engine or an artificial intelligence (AI) engine or system, however it is understood that this technology is directly applicable to a QA environment for testing SUT/application 100. As such, other suitable ways to refer to these embodiments may also be a testing engine or a QA engine or QA system or the like. In a QA setting, the present technology can be used to automate the behavior of a QA engineer or a human, who performs either a partial or exhaustive testing of SUT/application 100 by interacting with its GUI 102.

In such a QA environment, the system can be left running unmanned for an extended period of time, while it traverses through all aspects of the SUT through its GUI, stopping when some termination condition(s)/criteria are satisfied. Such an unmanned testing may be performed by either providing the system appropriate input datasets for testing or by generating input data on the fly or both. Such a capability is afforded via an Input Generator module as will be taught further below. For clarity of explanation in this disclosure, we will mostly refer to the embodiments as a learning engine/system or an AI engine/system, knowing of its wide applicability to a variety of settings, including QA.

SUT/application 100 of FIG. 1A may be a monolithic application with a thick client or GUI 102 or it may have a thin client, such as a browser based client, that communicates over the web to a backend webserver. For the purposes of present teachings, we are concerned with learning the behavior of SUT or application 100 entirely from its frontend client user interface (UI) or GUI 102. As such, we will not delve into the details of its server side implementation. GUI 102 of SUT/application 100 comprises a number of exemplary GUI objects or screen objects or screen/GUI elements or visual indicators shown in FIG. 1A. These include radio buttons 104 and 106, along with their corresponding texts or labels shown in adjacent rectangles with dashed lines. GUI 102 also includes a dropdown menu 108, a group 110 of checkboxes, a text input-box 112 and a slider or slider control 114.

It should be understood that GUI 102 of SUT or application 100 can include any number of other GUI objects known to a person of ordinary skill and not explicitly shown in the exemplary embodiment of FIG. 1A. A partial list of such GUI/UI objects includes scrollbars, rotating controls, drag-&-drop widgets, hyperlinks, checkboxes, etc. It should be further understood that the computing platform for SUT/application 100 may be a desktop computer as shown in FIG. 1A. Alternatively, it may be a laptop computer, a tablet, a mobile/smartphone, or it may comprise any other computing devices or infrastructure. A partial list of these includes computers of any kind, smart watches, smart TVs, smart home automation devices, any appropriate Internet Of Things (IOT) devices or even Big Data infrastructure environments such as Hadoop. The present technology is agnostic of the type of computing platform used to embody and execute SUT/application 100.

As mentioned, learning engine 200 shown in FIG. 1A is responsible for learning the behavior of SUT 100 from its GUI 102. According to the preferred embodiment, learning engine 200 learns the behavior of SUT 100 by utilizing artificial intelligence (AI) techniques, as will be taught herein. These techniques include supervised and unsupervised machine learning techniques. As such, we may also refer to learning engine 200 as AI learning engine in this description. Furthermore, we may also refer to the learning engine as the learning system or the learning tool or more simply just the system/tool when otherwise clear from the context.

It should be noted that learning engine 200 is typically a software only application according to the instant techniques, and does not require any specialized hardware to run on. However, there is no restriction on embedding the software code of learning engine 200 onto a firmware/hardware platform or onto or close to the semiconductor layer. The instant technology is also agnostic of the many types of architectural implementations available to a person of average skill for deploying the various embodiments of the learning engine taught herein.

In the diagram of FIG. 1A, learning engine 200 is shown to run on the same platform on which SUT or application 100 is being executed. This is a typical execution environment for engine 200 as it allows engine 200 (specifically its client as will be discussed below), to monitor SUT 100 via its GUI 102. It also allows engine 200 to directly exercise various actions on GUI 102 as will also be disclosed further below. However, it is conceivable that engine 200 may be running on a different platform than SUT 100 and is still able to control SUT 100 via its GUI 102.

Such indirect monitoring and control mechanisms may involve engine 200 communicating with SUT 100 through one or more of a number of distributed computing mechanisms, including Remote Procedure Calls (RPC), Java Remote Method Invocation (RMI), Common Object Request Broker Architecture (CORBA), Java Message Service (JMS), Microsoft's Distributed Component Object Model (DCOM), etc. However, for ease of explanation in this disclosure, we will utilize the embodiment of FIG. 1A where engine 200 (specifically, its client portion as will be discussed below), is running on the same platform as SUT 100. Although, we will be aware of the availability of various alternative architectural implementations known to an ordinary practitioner.

Figure 1B:
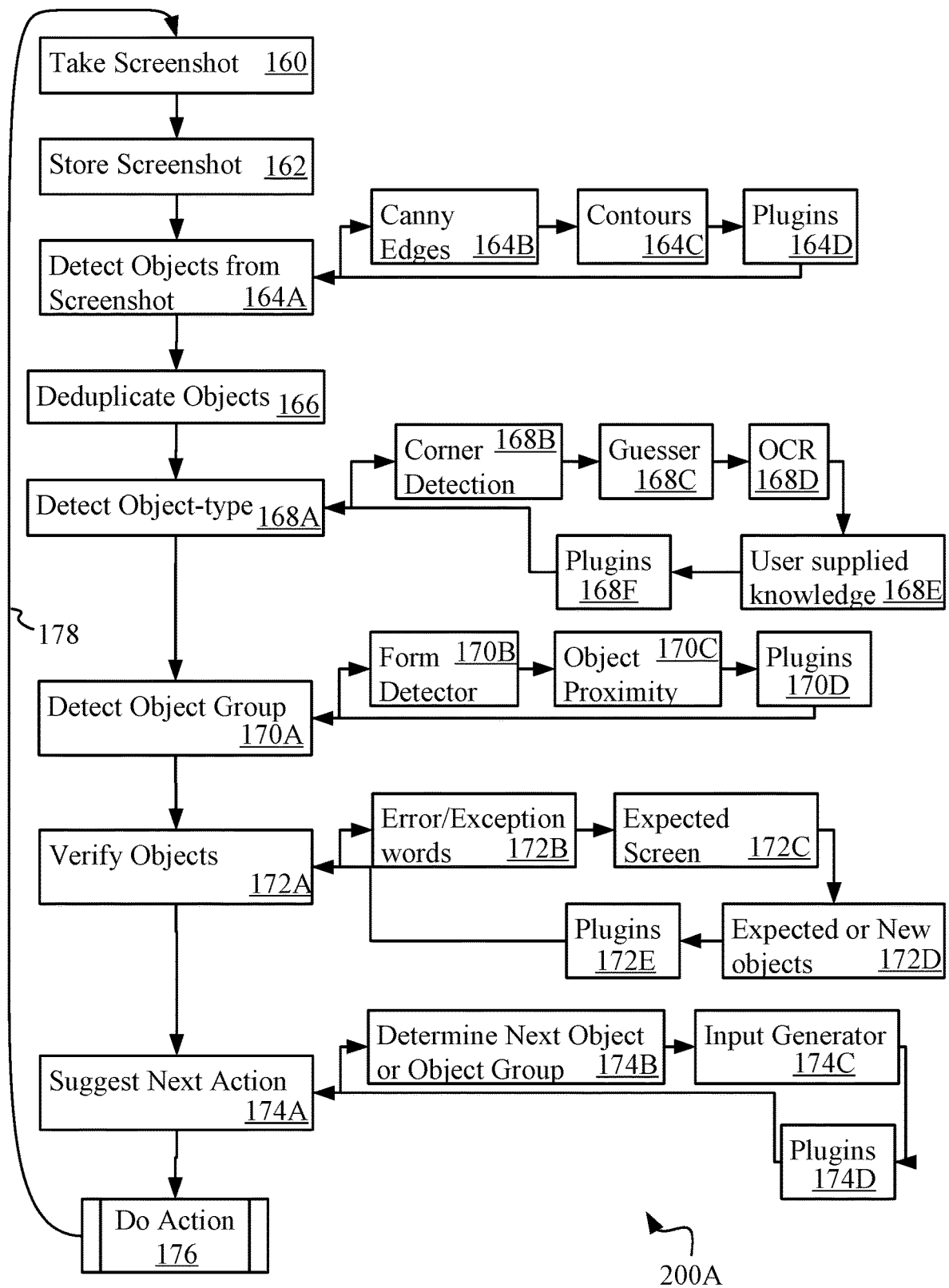
FIG. 1B is a high-level diagram of the functional flow of the learning/testing engine according to the invention.

The high-level functional flow of an exemplary embodiment of learning engine 200A is depicted in FIG. 1B in a flowchart form. The high-level operation of the system can be thought of as comprising a loop 178 as shown. Learning engine/system begins loop 178 by taking a screenshot of GUI 102 as shown by Take Screenshot function/module 160. Engine 200A then stores the screenshot in a database or datastore as shown by Store Screenshot function/module box 162. Note that most or all of the subsequent functions to be described also result in storing the learned knowledge about SUT 100 in the database. Although the database access/storage steps may not always be explicitly stated in the below description to avoid detraction from the main teachings. Such routines will be apparent to a skilled practitioner for a given implementation of the instant technology.

Store Screenshot 162 is followed by detecting objects on the screenshot as shown by Detect Objects from Screenshot module/function 164A. Note that function 164A is a chain of successive algorithms applied by system 200A to detect objects from the screenshot. The chain includes detecting objects by applying the familiar Canny edge detection operation, as depicted by function/module 164B. Subsequently, a suitable contour detection algorithm may be applied as shown by function/module 164C. Finally, system 200A can also accommodate a user supplied algorithm or operator as a plugin for detecting objects in the chain. This is shown by Plugin function/module box 164D.

Object detection can lead to duplicate objects being detected by the object detection chain explained above. Therefore, an object deduplication function is carried out as shown by Deduplicate Objects function/module 166. This is followed by detecting the type of each object just detected, referred to by its object-type. The object-type indicates the type of screen object that was detected, for example, a dropdown or a radio button, or a checkbox, or a text input-box, or a hyperlink, etc. Like object detection, object-type determination or detection as shown by Detect Object-type box 168A, is also carried out in a chain.

The chain includes detecting the corners of the object, applying a guessing logic to determine its object-type, applying Optical Character Recognition (OCR) to determine its object-type from any accompanying text, and enabling the user of system 200A to indicate its object-type in a supervised learning manner. These capabilities are indicated by functions/modules Corner Detection 168B, Guesser 168C, OCR 168D and User supplied knowledge 168E respectively in FIG. 1B. Finally, a user supplied plugin may be used to detect the object-type, as shown by Plugin function/module box 168F.

Next, system 200A determines if each object detected, deduplicated and identified by its object-type above, belongs to a logical group of objects, referred to as an object group. Examples of object group include forms, images and their associated texts, text and input-box field combinations, and other like object combinations. This function is shown by Detect Object Group function/module 170A. Function/module 170A may also accomplish its objectives by applying several operations in a chain. These are form detection, i.e. whether the objects are related to each other in a form as shown by Form Detector function/module 170B. This is followed by determining the proximity of objects to one another to determine if they are related. This is shown by Object Proximity function/module 170C. Finally, as before, a user supplied plugin may be applied to determine if more than one objects belong in a group, as shown by Plugin module 170D.

Next an object verification step is carried out as shown by Verify Objects module 172A. This process is also carried out in a chain. Each step of the chain records any relevant results into the metadata of the object. Object verification chain includes first verifying that the OCR reading of the object as performed by OCR module 168D above indicate any error/alert words. If so, an error indication is recorded in the metadata of the object. This capability is shown by function/module 172B. This is followed by comparing the current screenshot with the previous screenshot to ensure that the screen is not unexpected in the normal flow of SUT 100, as indicated by box 172C.

Next is verifying that the objects detected are indeed expected objects that are amongst the list of objects that system 200A can detect, as shown by box 172D. If not, then this error condition is also recorded into the metadata of the object. Finally, as before, a user supplied plugin may be employed to achieve the above verification objectives, as shown by box 172E. If any of the above verification checks fail, then an alert is raised and sent to the user of learning engine 200A. The alert may be sent via email with an image of the object/screen containing the error. Loop 178 of engine 200A then progresses forward to suggesting the next action to be performed on the objects. This is indicated by Suggest Next Action module/function 174A.

Suggest Next Action 174A functionality is implemented by first determining which objects or object groups to utilize for this functionality. This is shown by Determine Next Object or Object Group function 174B. To accomplish its objectives, function/module 174B first checks to ensure that the object is indeed interactive or actionable. If the object is a part of an object group as explained above, then at least one object of the group must be interactive. Next, function/module 174B determines the total number of actions applied to the object or object group, thus far. This number is also referred to as the action-count. It proceeds with the object or object group with the lowest action-count.

Next module/function 174B determines the weight or priority of the object or object group. The weight/priority may be system determined in an unsupervised learning manner, or user supplied in a supervised learning manner. Finally, function/module 174B selects the object or object group with the highest weight/priority. Then an Input Generator module 174C is invoked to supply the input for the object. Next action to be performed on the object/group is determined by employing Input Generator 174C in concert with Guesser 168C above. The next action would best increase the knowledge of the object given its object-type, or given its association in a logical object group. Of course, as before, a user supplied plugin may also be used to provide the above capability, as shown by Plugin 174D.

Note that any information captured in the object verification chain above of functions/modules 172A-E and recorded in the metadata of the objects is available to Suggest Next Action functionality 174A. If there is an error condition recorded in the metadata of the action, then module 174B will skip this object or object group from its selection. That way suggesting actions can be avoided for any objects in SUT 100 that have a problem or have an error situation. However, recall, that the verification chain would have already alerted the user of the error situation or problems encountered above in the verification chain.

At this junction, loop 178 of engine 200A shown in FIG. 1B performs the next action identified above, as shown by Do Action sub-routine box 176. The loop then repeats from Take Screenshot 160 mentioned earlier. The loop continues until a termination criterion/criteria/condition(s) is/are satisfied. Exemplary termination criteria include that no new actions can be suggested by Suggest Next Action 174A thus indicating that sufficient learning of SUT 100 has been achieved, or a predetermined timer has run out. Exemplary termination condition includes the deliberate termination/halting of system 200A by the user.

It is possible that during the operation of learning engine 200A, the URL of GUI 102 of SUT 100 navigates outside of SUT 100. Learning engine 200A recognizes this scenario and resets the URL back to the previous page to continue executing loop 178. In a similar scenario, it is possible that SUT 100 may get stuck on a terminal screen or a screen loop of its GUI 102 such that Suggest Next Action 174A is not able to suggest any new actions. For example, if the terminal screen only has an Ok button or a Refresh button that keeps bringing it back to the same screen. In such a scenario, based on a user supplied or configurable setting, system 200A may halt itself or restart SUT 100.

It is worth noting that as the above functional flow of the exemplary embodiment of engine 200A shown in FIG. 1B is executed, the user of the engine/system is able to see which screens of SUT 100 with GUI 102 are active and what actions have been performed. As a result, the user is easily able to provide supervised machine learning inputs to the above operational flow of the instant technology.

Figure 2:
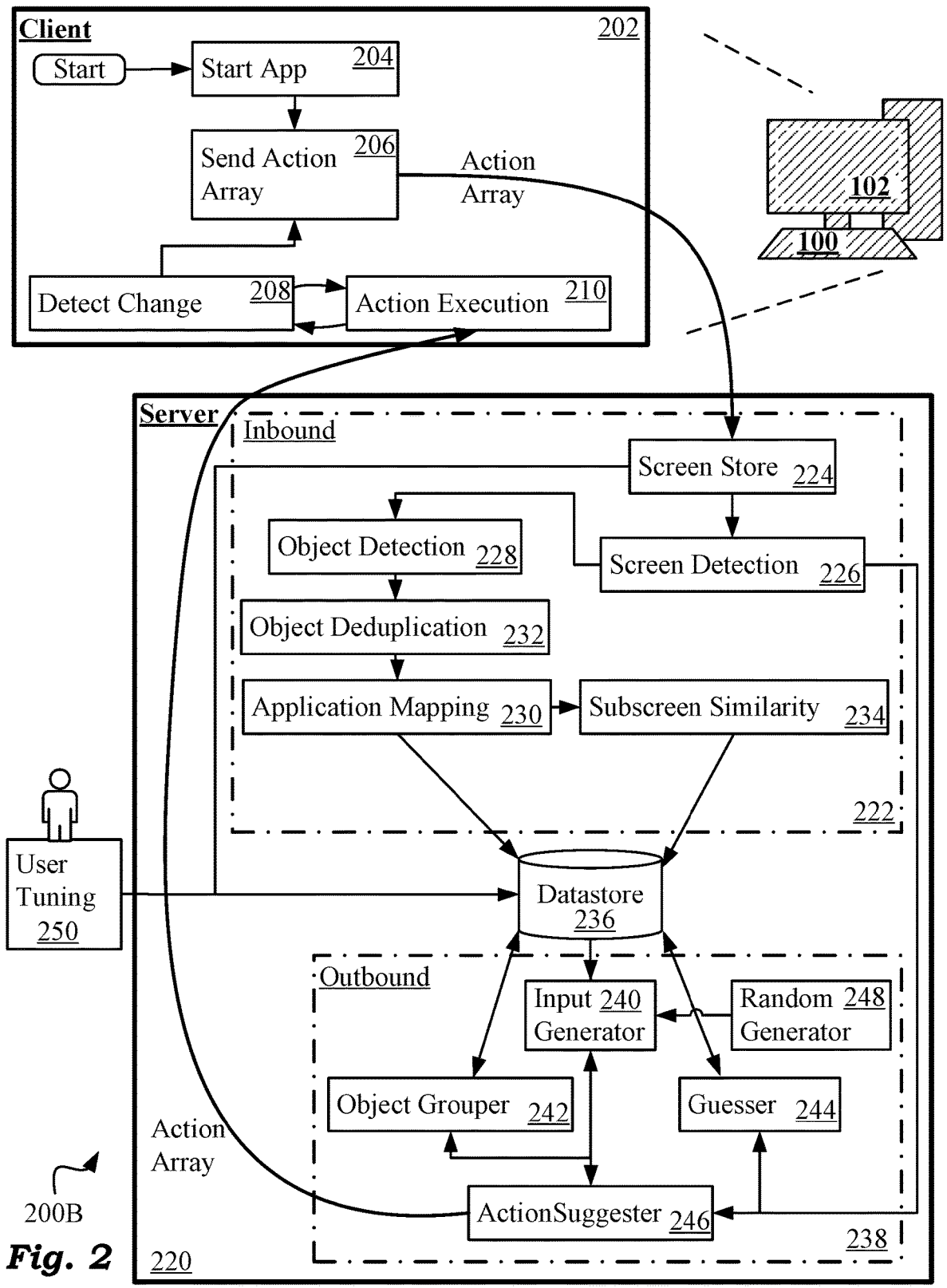
FIG. 2 is a detailed functional diagram of the main embodiments illustrating the various functions/modules of the instant learning/testing engine operating in a client-server model.

Now we will take a much more detailed look at an exemplary implementation of the instant technology. This detailed view is facilitated by reviewing FIG. 2 showing in a flow diagram form, the detailed functional flow of the embodiment first introduced in FIG. 1A and its associated explanation. Although there are many similarities between the embodiments of FIG. 1B and FIG. 2, the reader is cautioned that all functional details in FIG. 2 may not be directly mapped to the various functions/modules shown in the diagram of FIG. 1B. This is intentional, because it lets us provide useful variations of the implementation of the instant technology.

We will employ FIG. 2 to detail the workings of the various functional units/modules in an exemplary implementation of the technology. Other alternate variations of the implementation may also be conceivable by a practitioner. Moreover, in the below detailed explanation, we may also use other diagram figures, but we will keep returning to FIG. 2 as this will guide us to complete the present teachings in a logical manner.

FIG. 2. shows that AI learning engine 200B, or simply learning engine or system 200B, of the instant technology consists of a Client module 202 and a Server module 220. SUT 100 is shown in FIG. 2 by a hatched pattern and at a smaller scale than FIG. 1A to avoid detraction. Client 202 is in charge of collecting the screenshots or screen captures of GUI 102 of SUT 100 and performing coordinate based GUI operations to monitor changes in the screens as will be taught below.

Client 202 preferably runs on the same platform as SUT 100 and can be custom developed for that platform. The custom development may be in any of the available programming environments of choice, including Java, C/C++, Javascript, Python, Perl, Ruby, etc. Alternatively, Client 202 can be based on any of the available industry automation tools, for example, Selenium, Sikuli, HP QuickTest, etc. The responsibilities of Client 202 include simulating mouse and keyboard actions on GUI 102 of SUT 100, capturing screenshots and communicating with Server 220.

Now let us see the functional working of AI Client 202 in detail. Client 202 starts or initiates SUT 100 as shown in FIG. 2 via a Start App function/module box 204. Module 204 constructs the initial Action Array data structure or construct. Action Array will contain the actions performed by Client 202 on GUI 102 and the results of those actions in the form of corresponding screenshots or screen captures. It then communicates the initialized Action Array to Server 220 by invoking Send Action Array function/module 206. Specifically, Send Action Array function or module 206 communicates Action Array to Screen Store function/module 224 of Server 220 as shown in FIG. 2.

When learning engine 200B first starts, Start App function/module 204 initializes an empty Action Array, and a first screenshot of GUI 102 is taken. The empty Action Array with the initial screenshot is then sent to Server 220 by Send Action Array function 206. As will be discussed below in the explanation of the functional working of Server 220, the screenshot then undergoes processing from various functional modules of Server 220. Last of such server side modules, Action Suggester function/module 246 would then send the populated Action Array with the suggested actions to perform on the various objects, back to Client 202 (specifically its Action Execution function/module 210).

Client 202 also has two other functions/modules, Detect Change 208 and Action Execution 210 mentioned above. Action Execution 210 executes each item in Action Array until a screen change is detected based on the page or object level thresholds, page_level_threshold and object_level_threshold, defined in Action Array and to be further discussed below. This change is detected by Detect Change function/module 208. Specifically, when Detect Change 208 detects the change in the page/screen of GUI 102 to be over page_change_threshold, or if it detects the change in an object to be over object_change_threshold, then it takes a new screenshot of GUI 102 and sends an updated Action Array containing the image of the screenshot just taken, to Send Action Array function/module 206 which then sends it to Screen Store 224.

Note that having both page and object level change thresholds as explained above, provides an optimization in processing capacity and time required by learning system 200B. Specifically, if Detect Change 208 only used a page level change threshold then regional and minor changes in the screen may not be sufficient to go over the page level or global threshold page_level_threshold. Such small regional changes include pressing of a radio button, or the boldening of a label upon mouse hovering, etc. In such a scenario, page_level_threshold would not be triggered.

In another optimization designed into the technology, when more than one actions belong to a group, as determined by their action group id (explained further below), Action Execution 210 performs all actions in the group. After all actions in the group have been executed, Detect Change 208 then monitors if the change in the screen of GUI 102 is above the page/global or object level thresholds explained above. If so, as before, it takes a screenshot of the screen and sends an updated Action Array with the image of the screenshot to Send Action Array module 206 which then sends it to Screen Store 224 in Server 220. Such a grouping functionality is useful for screens containing grouped GUI objects, such as Login Screens, Forms, and the like.

In the absence of such a grouping functionality, multiple screenshots would be sent to the server, thus incurring multiple roundtrips cost to the processing. In other words, as each action would get executed and page_level_threshold or object_level_threshold discussed above would get triggered, a new screenshot would be sent to the server. Server 220 would then need to maintain the application state and determine what needs to be done next. Consider for example a Login screen. The username would be entered on the Login screen first. That would trigger one of the two change thresholds above. A new screenshot would be taken by Client 202 and sent to Server 220. Server 220 would then need to know that the next action needs to be the entry of the password field. This action would be suggested in Action Array which would be sent to Client 202 as will be explained in detail below.

Action Execution 210 of Client 202 would then enter the password field, a new screenshot would be taken and sent to Server 220. Server 220 would then determine that the next action is to press the Login button and would send Action Array back to the client which would then press the Login button. This process would result in three roundtrip communications between the client and the server as opposed to just one as afforded by the instant design. Specifically, Object Grouper 242 to be discussed further below, groups username field, password field and Login button into an object group. As a result, Client 202 executes all of the above described three actions successively, then determines if the change thresholds are triggered, and then takes a screenshot and sends to the server. The above optimization technique provides for a significantly higher performance design of the present embodiments than otherwise possible.

Having understood the functionality of Client 202, let us now look at Server 220 of our AI learning engine/tool 200B in detail. AI Server 220 or simply Server 220 of FIG. 2 may be operated using any number of execution models available in the art. These include a dedicated server on a separate machine that communicates with Client 202 using one of the many network and communication paradigms in a client-server model available in the art. Such client-server networking models and standards are well understood in the art and will not be delved into detail in this specification. Further, Server 220 may be in-house or hosted, it may be on a shared or a cloud based server, where the cloud could be private, public, semi-private, etc. The cloud based embodiments may utilize the many cloud services available from vendors including Amazon, Microsoft, IBM, Oracle, etc.

Now let us look at the individual functions and modules of Server 220 in greater detail.

Screen Store 224

As already explained, Action Array construct is communicated by Client 202 to Screen Store function/module 224 of AI Server 220. Screen store 224 is responsible for storing Action Array into Datastore 236. The Action Array contains the action just performed by Client 202, specifically by its Action Execution module 210, and the consequent result in the form of an image or screenshot as explained above.

Datastore 236 may be implemented using any of the suitable technologies available in the art. These include database(s), data warehouse(s), data mart(s), Big Data cluster(s), File System(s), In-Memory database(s), Object database(s), and the like. It should be noted that Screen Store 224 stores every image that Client 202 sends to it. In other words, Screen Store 224 stores each copy or instance or version of Action Array received by it. Each instance of the Action Array includes the action performed and the resulting screenshot of GUI 102.

Note that aside from Screen Store 224, most or all of the subsequent functions/modules to be described may also result in retrieving or saving or updating data about SUT 100 in the database. Such database access/update operations/routines will be apparent to an ordinary practitioner in the technical implementation of the various functions/modules to be described. As such, they will not always be explicitly called out while describing these modules, to avoid detraction from the key principles of the instant teachings.

Screen Detection 226

Once Action Array has been stored in Datastore 236, then Screen Detection function 226 is triggered. Note the difference between Detect Change function 208 of Client 202 versus Screen Detection function 226 of Server 220. The former is responsible for detecting a change in the GUI screen on the client side. As explained, it does this by checking if either of page_level_threshold or object_level_threshold has been triggered. If so, a screenshot/capture of the GUI is taken by Client 202 and an updated version of Action Array is sent to Server 220 by Send Action Array 206. In comparison, the latter is responsible for subsequent and generally more granular detection of changes in the screen as will be discussed below.

It should be noted that in this disclosure we may use the terms page or screen interchangeably to refer to a specific screen of GUI 102 of SUT/application 100. Since GUI 102 may be of a thick client or a thin or browser based client, the term screen may be more appropriate for a thick client, and the term page may be more appropriate for a web or browser based client. However, to avoid unnecessary duplication that may detract from the main teachings, we will use the terms page and screen interchangeably to refer to a snapshot of GUI 102 at a particular instance of time.

Note also the difference between a screen or page which refers to the actual screen/page of GUI 102, and a screenshot of it. A screenshot or screen capture or screenshot image or screen image or simply image, refers to a snapshot or picture of the screen/page at a particular instance of time. Furthermore, when referring to objects on the screen when their functionality is not known, we may refer to them as "screen" objects. This is to emphasize the fact that at this stage the functionality of these screen objects, or their object-type, has not yet been identified. More specifically, Object Detection 228 detects the object regions of the screen objects on the screen, how they look like and X, Y coordinates of their location on the screen.

It is Guesser and Action Suggester modules/functions 244 and 246 respectively, in conjunction with still other modules/function, that are responsible for determining the object-type or the functionality of the objects. All these modules will be explained in much more detail further below. Also, once we reach the teachings associated with determining the object-type of objects, we will drop the above emphasis of using "screen" before the objects, and start referring to them as actual objects or simply as objects. Now let us return to Screen Detection function/module 226 on the server side.

Specifically, Screen Detection 226 performs the following logic:

A. It first compares the screenshot in the latest version of Action Array received and stored in Datastore 236 by Screen Store 224, with the previous screenshot stored in Datastore 236. In other words, module 226 compares the screenshot in the latest copy/instance/version of Action Array against the screenshot in the most recent previous version of Action Array. This comparison is based on the page/global level threshold discussed earlier. The default value of page level threshold is preferably set to 99%.

If the currently received screenshot is the same as the previous screenshot, then there is no state change in SUT/application 100 between the two successive screenshots/images. This exemplary scenario is illustrated in the graph of FIG. 3 where Image1 shown by bubble or node 302 and Image2 shown by bubble/node 304 both point to Page1 shown by bubble or node 314. This is because Screen Detection function 220 has determined that the two images are of the same page/screen of GUI 102. In such a scenario when no change is detected between successive screenshots/images, Action Suggester function 246 which is explained further below, is directly called as shown in FIG. 2.

B. However, if the screenshot has changed as compared to the previous screenshot, then the screenshot is looked up amongst all the existing screenshots/images in Datastore 236. This is accomplished using Application Mapping function/module 230 as will be explained further below. This exemplary scenario can also be seen in FIG. 3 where Image3 at node 306 is determined by Screen Detection 226 to be a new page/screen and referred to as Page2 at node 316. In such a scenario when a new page/screen is detected, Screen Detection 226 calls Object Detection function/module 228.

Object Detection 228

Object Detection function/module 228 performs zero-metadata detection. This is one of the key differentiating features of the instant technology. There is no prior knowledge or metadata needed about a screen object before it is detected. The detection is based solely on visual indicators in the GUI, such as GUI 102 of FIG. 1A and FIG. 2. Specifically, the detection is based on scanning an image/screenshot of GUI 102 and detecting the edges/contours of the object using Canny edges or any other edge detection algorithms available in the art. The detection may proceed in a chain to the next edge or contour detection algorithm for further refinement of the results. Any number of such edge or contour detection algorithms available in the art may be employed. Additionally, any user supplied algorithm may also be incorporated or applied as a plugin.

Once an object has been detected as explained above, the following information is stored about the object. X and Y coordinates of the location of the object on the screen, the Height and the Width of the object. For objects, that are not rectangular or square objects, the Height and Width of an imaginary four-sided box around the object are stored. Examples of such objects include, triangles, circles, ovals, etc. In alternative embodiments, the Height and Width of the object are estimated. The estimation of Height and Width may be based on a heuristic suitable for the object.

For example, for a circle, Height=Width=2*radius. For an oval, Width=distance between the two far ends, and Height=distance between the two near ends, for a triangle, Width=length of the longest edge, and Height=length of the shortest edge, etc. In still other embodiments, the actual area of the object based on its actual pixel geometry on the screen may be determined and then stored. This visual information about the objects is used in many other functions/modules of system 200B as will be explained below.

The scheme enables system 200B to learn objects that may have any shape. In other words, the present techniques provide any-shape detection capability that detects objects that may have any shape other than a square or a rectangle. Furthermore, as learning engine 200B executes its various functions/modules, more and more information/knowledge is gathered about the screen objects, until they are fully identified by their object-types with a high level of likelihood. Thus, the present techniques generate the metadata about the objects on the fly, as opposed to requiring it a priori. This process will be taught in much more detail in the sections to follow.

Unique Objects

Each screen object on the screens of GUI 102 detected by Object Detection 228 of FIG. 2 is eventually mapped to or linked to or refers to a data structure called Unique Object. Multiple screen objects may refer to a single Unique Object although one screen object may only refer to one and only one Unique Object. That is because the link between a screen object and its Unique Object is established based on the similarity of the screen object to its Unique Object. In other words, a screen object is linked to that Unique Object to which it is the most similar to. Note, that at this stage, the object-type of the screen object has not yet been determined. That is why we are still referring to it as the screen object and not the actual object or simply object.

Explained further, ultimately the object-type of the object determines what kind of a widget it is, or in other words, whether it is a radio button or a dropdown or a hyperlink, etc. The determination of the object-type will be discussed further below in relation to Guesser module 244. A screen object detected by Object Detection 228 would only have its X and Y coordinates on the screen, and its Height and Width (or area) stored. A Unique Object that is the closest in Height and Width (or area) and the most similar to the screen object detected, is linked to the screen object. See also under Object Deduplication 232. If no such Unique Object exists, a new Unique Object is created by Server 220 having the Height and Width of the screen object. Before the above link is established though, the screen object also undergoes deduplication as will be explained further below.

The functionality afforded by Unique Objects is important because it is not uncommon that the same object appears on multiple screens/pages of a user interface (UI) such as a GUI, albeit at different locations or X and Y coordinates. A good example of such an object is the "Submit" button. It would be optimal that each time a Submit button appears on a page, it is identified as such and any knowledge acquired about it is stored in a unique central object/location. According to the present teachings, such a central object/location is the Submit button Unique Object stored in Datastore 236. Using such a scheme, all the knowledge about individual/unique objects is efficiently housed in corresponding Unique Objects. The knowledge does not have to be distributed with each instance/appearance of that object in the GUI, such as GUI 102 of FIG. 1A and FIG. 2.

It should be noted however, that even though the same object may appear in multiple pages, its context (and location) may be entirely different. For example, the context around a text input-box on a page may be that of a product name while on another page it may be that of the manufacturer's address. Similarly, its location may be different from one page to another. It is therefore important to store this context, along with the actual object detected/discovered in the GUI. The contextual information includes the X and Y coordinates of the location of the object on the page/screen. In addition, a reference/link to the corresponding Unique Object housing the common knowledge about such an object is also stored. The common knowledge about the object stored in Unique Object includes its Height and Width, its image, and its likelihood per object-type as will be explained further below.

Object Deduplication 232

After an object is detected by Object Detection 228 per above explanation, it undergoes the process of deduplication before linking it to its corresponding Unique Object. This is important because Object Detection 228 may employ multiple object detection algorithms as already discussed. This may result in the same screen object detected multiple times, resulting in duplicates. Object Deduplication 232 enables system 200B to uniquely detect which objects are the same across the whole SUT by identifying and rejecting duplicates. As mentioned, after deduplication the corresponding Unique Objects are identified and linked to the screen objects detected by Object Detection 228. As explained, this enables the system to apply the same knowledge of an object across the whole SUT.

Object Deduplication function/module 232 deduplicates using a similarity scale rather than based on a 100% match or identifying the two objects to be identical. Similar to object detection explained earlier, object similarity can be performed using any of numerous algorithms available in the art. A suitable user supplied algorithm can be plugged into the system as well. In the preferred embodiment, for each detected screen object, say Object1, object deduplication in learning system 200B uses the following scheme.

A. Query Unique Objects stored in Datastore 236 for images of all objects with the same Height/Width as Object1. The result is a set of returned images with the same size, referred to as [Unique Objects, Set1].

B. The image of Object1, i.e. Object1-Image is then converted to monochrome. This is easily achieved by thresholding the pixels to a certain shade of gray and then converting them to either black or white. Object1-Image is then compared to [Unique Objects, Set1] images in parallel using the following steps:

a. Convert the presently indexed/accessed image i in [Unique Objects, Set1] to monochrome.

b. Compute the difference between Object1-Image and image i into an image array. Store the total count of pixels that are different into the term PixelDiff.

c. Similarity between Object1-Image and image i is then calculated as:

$$\text{Similarity} = (\text{PixelDiff}/(\text{Height} \ast \text{Width})) \ast 100 \qquad \text{Eq. (1)}$$

Note that since the expression (Height*Width) is simply the area of the screen object, in alternative embodiments this expression may be substituted by the area of the screen object if it is not of regular shape, such as a square or a rectangle.

d. Finally, the images that are the same by at least the object level threshold discussed earlier, preferably set to 99%, are marked as the same or duplicate objects.

Application Mapping

After objects on the pages/screens, i.e. screen objects, of the GUI, such as GUI 102 in FIG. 1A and FIG. 2, have been detected and deduplicated, control is passed onto Application Mapping function/module 230. Application Mapping 230 maintains the state transition model of SUT 100. A state transition model is a finite state machine (FSM) and is a familiar concept that finds many uses in the art. In Document Object Model (DOM), a state is used to represent the client state of a Rich Internet Application (RIA) and a state transition represents the actions or events that caused the transition from one state to another.

As such, a state transition model can be used to model the behavior of an application as it changes its various states due to various actions/events. The actions are in turn triggered by inputs in the form of GUI interactions either supplied by the user or by other alternative means such as Client 202 of FIG. 2. For a detailed treatment of this familiar topic, the reader may refer to one of the many references on the subject available in the art. These include NPL references "Component-Based Crawling of Complex Rich Internet Applications" dated 2014 by Seyed Ali Moosavi Byooki of University of Ottawa and "Distributed Crawling of Rich Internet Applications" dated 2015 by Seyed M. Mir Taheri also of University of Ottawa.

In the context of the present invention, Application Mapping module 230 maintains the state transition model, also simply referred to as the Application Map, of SUT/application 100. State changes in SUT/application 100 occur in response to actions caused by Action Execution 210 explained above. As will be apparent by now, these actions are in turn simulations of interactive inputs to GUI 102 that a human user would have provided. These actions are instead automated/simulated by learning engine 200B, and specifically Action Execution 210 module of its Client 202.

A changed screenshot/image detected by Screen Detection 226 (as compared to the previous screenshot/image) indicates that a state change in SUT/application 100 has occurred. The state change triggers Object Detection 228 and Object Deduplication 232 in sequence as explained above. Then, Application Mapping 230 module checks to see if the changed screenshot/image already exists in the Application Map of SUT/application 100. If not, a new entry/node is created in the Application Map of SUT 100. Application Mapping module 230 also records which action in Action Array caused the state change to occur.

To understand this functionality further, consider again the data model represented in FIG. 3. It should be noted that the term "data model" is being used here in the context of a graph database, not a relational database. As will be familiar to those skilled in the art, in a graph database, the key concept is the graph (having nodes, edges/relationships and properties) which directly relates data items in the store. The data model of a graph database is naturally a graph, such as the one represented in FIG. 3. The graph in FIG. 3 shows that Screen Detection 226 has determined that successive images Image1, Image2 at nodes or bubbles 302, 304 respectively represent the same page/screen in GUI 102 of SUT/application 100.

This page is referred to as Page1 at node 314 in FIG. 3, and both Image1 and Image2 point to Page1. Recall from earlier teachings that these images are received by Server 220 in updated versions of Action Array from Client 202, which are then stored in Datastore 236 by Screen Store 224. Since by now we know in detail how successive images are received from Client 202 by Server 220 and stored in Datastore 236, from here onwards we may drop restating this mechanism to avoid repetition and for clarity of the teachings.

Returning our attention to the graph of FIG. 3, the next screenshot/image Image3 at node/bubble 306 is detected to be a changed screenshot/image representing a state transition. Thus, Application Mapping module 230 first checks if the changed screenshot/image already exists in the Application Map of SUT/application 100. In the example of FIG. 3, Application Mapping 230 does not find Image3 in the existing screenshots/images stored in Datastore 236. It therefore creates a new node/entry in the Application Map of SUT/application 100.

In FIG. 3, the new node is now referred to as Page2 in bubble/node 316, representing the new screen/page of GUI 102 of SUT/application 100. Subsequently, next image Image4 at node 308 is determined by Screen Detection 226 to be the same as Image3, representing no state change or transition. Thus, no new node in the Application Map is created, and both Image3 and Image4 at nodes 306 and 308 respectively point to Page2 in the graph of FIG. 3. Subsequently, next image Image5 at node 310 is determined by Screen Detection 226 to be a different screenshot/image indicating a state transition resulting in the creation of a new node Page3 318, per above explanation.

Finally, next image Image6 is also determined by Screen Detection 226 to be a different/changed screenshot/image indicating a state transition. Application Mapping 230 searches for Image6 in Datastore 236 and finds it to be the same as existing images Image1 and Image2 which are associated with Page1 in the Application Map. It therefore points Page3 back to Page1 in the Application Map of SUT/application 100 as shown in FIG. 3. Note that Image1 and Image2 are successive images of GUI 102, but Image6 is not, however they represent the same screen/page of GUI 102. This is quite possible, since in response to user inputs or actions simulated by Client 202, Page1 may be followed by Page2 to be followed by Page3 to be followed again by Page1 in GUI 102.

The state transitions and the actions that caused them are stored in the Application Map of SUT/application 100 by Application Mapping module 230. As already explained, the state transitions in the above example shown in the graph of FIG. 3 are from Page1 to Page2 to Page3 and then back to Page1. Thus, along with these state transitions, the specific actions causing them, such as clicking of a button or text input in an input-box, etc. on pages Page1-3, are all stored in the Application Map.

To complete our explanation of FIG. 3, Pages1-3 are shown to be pointing to or referring to screen Objects 11 . . . 3N which are shown to be eventually pointing to or referring to Unique Objects1-4. Objects 11 . . . 3N are the specific instances of objects that after deduplication refer to a smaller number of Unique Objects. As per above explanation, the context including the screen coordinates of specific objects on the screen is stored with individual screen Objects11 . . . 3N, however each one of them refers to Unique Object1, Unique Object2, Unique Object 3 or Unique Object4. The common knowledge learned by the system about individual Unique Objects1-4 is eventually stored in a data structure or construct Object Knowledge 346 which is stored in Datastore 236. In an alternative variation, the knowledge associated with each Unique Object is stored with the Unique Object itself.

Application Mapping 230 in FIG. 2 uses Sub-screen Similarity function 234 to perform partial comparisons of pages/screens. This functionality is explained below.

Sub-Screen Similarity 234:

Application Mapping 230 utilizes Sub-screen Similarity function 234 to determine whether a page already exists in the Application Map or not. The page/node in the state transition model or Application Map can be configured to use only a selected list of screen objects when the page is being compared to another page. This is another optimization technique of the present technology. A specific attribute is maintained in each page that determines if that page is set for comparison based on sub-screen similarity. This attribute is called sub-screen similarity comparison attribute.

The sub-screen similarity comparison attribute of a page may be set/marked either algorithmically or by the user. If it is set by the user, then User Tuning capability 250 as shown in FIG. 2 may be leveraged. When this attribute of a page is set, there is also a list of screen objects of that page that are used for comparing the similarity of that page to other pages. Again, this list of screen objects may be chosen automatically by the system or provided/selected by the user. As already explained, these screen objects ultimately refer to Unique Objects stored in a database such as Datastore 236 of FIG. 2.

The list of screen objects to be compared could be a whitelist containing only the screen objects from the page to be compared. Alternatively, the list of screen objects may be a blacklist indicating that all screen objects of the page except those in the blacklist need to be compared. In either case, the above scheme results in the generation of a comparison mask for the page containing only the pixels of the page that need to be compared.

This process is visualized in the graph of FIG. 4, where PageN at node 400 has screen objects ObjectN1, ObjectN2, ObjectN3 and ObjectN4 at nodes 402, 404, 406 and 408 respectively. These screen objects correspond to Unique Object1, Unique Object2 and Unique Object3 at nodes 412, 414, 416 respectively as shown. Of these, ObjectN1, Object N2 at nodes 402, 404 respectively with their corresponding Unique Object1 are included in the comparison mask referred to as Page Mask 420 in FIG. 4. However, ObjectN3, ObjectN4 at nodes 406, 408 with their corresponding Unique Object2, Unique Object3 at nodes 414, 416 respectively are excluded from Page Mask 420 thus created.

As already stated, the whitelisted or blacklisted screen objects used in the comparison may also be provided by the user of system 200B of FIG. 2. This capability may be housed by User Tuning function/module box 250 in FIG. 2. The user may provide this input by clicking on the objects to be included/excluded on the screen at runtime. In one embodiment, the user console of system 200B shows the Application Map and all screens of SUT 100. The user can then select the screen objects within a certain page that need to be excluded or blacklisted from the comparison. Alternatively, the user may also select screen objects need to be included or whitelisted into the comparison.

The above screen object selection can also be performed after a full run of system 200B against SUT 100. Then, the next time system 200B is executed against SUT 100, the user defined blacklist/whitelist of the objects is used by the system for comparison. Furthermore, this blacklist/whitelist capability may also be provided by an external or supplemental Artificial Intelligence (AI) module that determines which screen objects of a page in the Application Map should be blacklist/whitelisted.

When a page is entered into the Application Map by Application Mapping 230, a comparison mask is also generated for the page if its sub-screen similarity comparison attribute is set. The comparison mask is based on the above explained blacklist/whitelist of screen objects to be included into or excluded from comparison. The comparison mask is stored along with the page in the Application Map. Alternatively, the comparison mask may be generated on the fly once a page whose sub-screen similarity comparison attribute is set, needs to be compared. The comparison mask can be implemented as an array containing pixels that need to be compared for the page.

To explain this functionality further, consider the example shown in FIG. 5. The scenario compares PageNew 362 to all the pages, Page1, Page2, . . . PageM, previously known and stored by Application Map 230 in the state transition model of SUT 100. Sub-screen Similarity function/module 234 of FIG. 2 would start by comparing PageNew 362 to Page1, Page2, . . . and so on. Alternatively, the sequence of comparison could be reversed and be started from PageM, PageM-1, . . . Page1. In any case, let us assume that PageNew 362 is being compared to PageN 360 stored in the state transition model or Application Map.

PageN 360 has its sub-screen similarity comparison attribute set/marked, and the screen object to be excluded from comparison is shown by reference numeral 150. Thus, screen object 150, which in the example of FIG. 5 is a changing advertisement, needs to be excluded from the set of pixels in PageN 360 that should be compared. The comparison mask generated for PageN 360 per above explanation, is shown as PageN Mask indicated by reference numeral 364. PageN Mask 364 contains all the pixels of PageN 360 for comparison, except those in the shown hatched pattern which in turn corresponds to screen object 150 of PageN 360. Then PageN Mask 364 is applied to both pages PageN 360 and PageNew 362 to yield their masked versions.

In FIG. 5, the above process yields pages PageN Masked 366, and PageNew Masked 368. These pages contain all but the blacklisted screen objects from original pages PageN 360 and PageNew 362 respectively. The blacklisted screen objects are contained in rectangle 150 or the hatched pattern of PageN Mask 364. Then PageNew Masked 368 is compared to PageN Masked 366 as shown by comparison diamond 370. The comparison yields that PageNew Masked 368 (and consequently original PageNew 362) is similar to PageN Masked 366 (and consequently original PageN 360) as shown by result oval 372.

The comparison operation shown by diamond 370 in FIG. 5 may be based on a monochromatic comparison of PageN Masked 366 and PageNew Masked 368. In other words, PageN Masked 366 and PageNew Masked 368 are first converted to their monochrome versions as explained earlier. Then their corresponding pixels are compared, and the total count of pixels that are different are added up into the term PixelDiff. Then, similarity between pages PageN 360 and PageNew 362 is computed using a variation of Eq. (1).

Specifically, Similarity is computed as (PixelDiff/ $(Height_{Page}*Width_{Page}-Height_{Excluded}*Width_{Excluded}))$ *100), where $Height_{Page}$ and $Width_{Page}$ are the height and width of the pages respectively, and $Height_{Excluded}$ and $Width_{Excluded}$ are the height and width of the total area excluded from comparison, that is, rectangle 150 or the hatched pattern in PageN Mask 364. If the similarity is above a preset threshold, preferably 99%, then PageN 360 and PageNew 362 are same/similar, otherwise not. If SUT/application 100 contains a lot of dynamic content, the above capability allows users to ignore that content for comparison. In the above example the dynamic content was in the form of a changing advertisement shown by object 150 of PageN 360.

Action Array

As explained above that the AI server and client communicate via Action Array construct. Action Array lists the actions that the Server is asking the Client to perform and the Client records the results of the actions as it executes those actions. If the changes between successive screens go above the page or object thresholds, the client stops executing further actions and sends the current screenshot back to the server with the updated Action Array. The updated Action Array contains the action results along with the latest screenshot taken. As already explained, in the case of grouped actions, such as a form, the client performs all the actions and then compares the screens. In any case, it communicates with the server as needed via Action Array data structure or construct.

Following is the format of Action Array data structure or construct in an exemplary embodiment. In the following format, Action Array unsurprisingly contains an array of actions to be performed. The term array here is understood to include an array data structure, or a linked list, or a struct or a class, etc. Other alternatives formats and implementations available in the art are also readily conceivable within the scope of the present technology. Note that the definition of various members/fields in the following format utilize the familiar universally unique identification (UUID) standard. Each member of the data structure also has an associated explanatory comment starting with a '#' at the beginning of a paragraph as shown below.

---

Action Array
[{
    screen_id: '<PriorImage_UUID>'
    # The above is the id of the prior screen. Its value is 0
    in the beginning.
    run_id: '<Run_UUID>'
    # The above is the id of this Run Instance.
    page_change_threshold: PageChgThresh%
    # The above is the Page Level Threshold. If the Page changes
    more than (1-PageChgThresh)%, the new screen is sent to the
    AI Server.
    new_screen_id: '<NewImage_UUID>'
    # The above is the id with which the new screenshot taken by
    Client 202 is uploaded for sending to AI Server 220.
    actions:
    # The following array contains all actions to be performed.
    [{
        object_id: '<uuid>'
        # id of the object.
        object_info: {X coordinate, Y coordinate; Height, Width}
        # Object coordinates and size information for performing
        action.
        action_to_perform: '{action_name, <any parameters needed
        for the action...>}'
        # Name of the action to be performed along with any
        requisite parameters. Client 202, specifically its module
        Action Execution 210 knows how to perform each action
        based on action_name and the associated parameters.
        Exemplary actions include 'hover' for hovering over the
        above identified object (with object_id and object_info),
        'click' for single-clicking on the above identified
        object, 'input' for providing text input to the above
        identified object such as if it were a text input-box,
        'double-click' for double-clicking on the object, 'upload
        hidden object', etc.
        # 'upload hidden object' action is sent by Server 220 to
        Client 202 to render a hidden object within a page. This
        capability is useful for a grid that requires scrollbars
        to be clicked or dragged in order to be have a full visual
        image of the hidden part of the scrolled window, also
        referred to as the hidden object.
        # For a full list of the actions in this member/field,
        see the section entitled "Guessing Logic" further below.
        action_group_id: '<group_id>'
        # id of the group that the action belongs to, if
        applicable.
        object_change_threshold: ObjChgThresh%
        # The percentage area of the object that must change in
        order to send a new screenshot/image to AI Server.
        actual_ results: {status, percentage change of area
        observed in the object}

-continued

Actual results as observed by Client 202. This field
        may be empty.
        execution_status: {'executed'}
        # Status of action execution if it was executed, blank
        otherwise.
    }]
}]

---

To facilitate further understanding, see below how the above members/fields in Action Array construct may be populated during an exemplary run of the system.

---

Action Array
[{
    screen_id: scr12345-e89b-12d3-a456-426655445879
    run_id: run12345-e89b-12d3-a456-426655445879
    page_change_threshold: 99%
    new_screen_id: img12345-e89b-12d3-a456-426655445879
    actions:
    [{
        object_id: obje1234-e89b-12d3-a456-426655445879
        object_info: {x: 265, y: 255, height: 100, width: 300}
        action_to_perform: 'click'
        action_group_id:
        grp12345-e89b-12d3-a456-426655445879
        object_change_threshold: 15%
        actual_results: {status: 'clicked', change: '1%'}
        execution_status: 'executed'
    },
    {
        object_id: obje1235-e89b-12d3-a456-426655445879
        object_info: {x: 285, y: 495, height: 10, width: 10}
        action_to_perform: 'hover'
        action_group_id:
        grp12346-e89b-12d3-a456-426655445879
        object_change_threshold: 40%
        actual_results: {status: 'hovered', change; 30%}
        execution_status: 'executed'
    },
    {
        object_id: obje1236-e89b-12d3-a456-426655445879
        object_info: {x: 265, y: 145, height: 100, width: 300}
        action_to_perform: click-type, type_text: 'X X X X X X X'
        action_group_id: grp12345-e89b-12d3-a456-426655445879
        object_change_threshold: 15%
        actual_results: {status: 'typed', change; 20%}
        execution_status: 'executed'
    },
    {
        object_id: obje1236-e89b-12d3-a456-426655445879
        object_info: {x: 265, y: 645, height: 100, width: 300}
        action_to_perform: click-type, type_text: 'X X X X X X X'
        action_group_id: grp12347-e89b-12d3-a456-426655445879
        object_change_threshold: 15%
        actual_results: ''
        execution_status: ''
    }]
}]

---

The server modules explained above comprise the Inbound functionality 222 of Server 220, as shown by the dotted and dashed line in FIG. 2. Specifically, the inbound modules of the server are Screen Store 224, Screen Detection 226, Object Detection 228, Object Deduplication 232, Application Mapping 230 and Subscreen Similarity 234. We call them inbound because they are mainly responsible for receiving communication from Client 202 and its consequent processing per above teachings.

Now let us look at the functions or modules of Server 220 comprising its Outbound functionality 238 as shown by the dotted and dashed rectangle in FIG. 2. These modules are mainly responsible for preparing the server for and then ultimately performing the outbound communication with Client 202. Specifically, Outbound functionality 238 is used after Application Mapping 230 of Inbound functionality 222 has processed and stored the latest page/screen received by Server 220 from Client 202 per above explanation.

Action Suggester 246 and Object Grouper 242 Recall from above that Action Suggester function/module 246 is invoked if Screen Detection 226 detects no change in the screen just received from Client 202. Action Suggester function/module 246 in concert with other modules (e.g. Guesser 244), populates Action Array shown above, with actions to be performed by Client 202. It uses information from Datastore 236, Guesser 244, Input Generator 240 and Object Grouper 242 to populate Action Array. It does this is by employing a breadth-first approach. It picks the largest screen objects on the screen first and continues suggesting until it has covered all screen objects down to the smallest ones.

More specifically, Action Suggester 246 retrieves the latest page/screen from Datastore 236 in which it was stored by Inbound functionality 222. It then uses a bread-first approach to pick screen objects of the screen stored in Datastore 236, that are the largest in size. Once it has picked a screen object, it populates object_id, object_info, and action_group_id (if applicable) fields of Action Array specified above. It then invokes Guesser 244 to determine what action to be "guessed" or tried on the screen object to determine its functionality. Guesser 244 does this by identifying the next action to be performed on the screen object and populating action_to_perform members/fields of Action Array specified above. Action Suggester 246 repeatedly invokes Guesser 244 until the page is known by a predetermined threshold.

Preferably, the threshold value above is set to 80%. In other words, Action Suggester 246 will repeatedly invoke Guesser 244 on the latest page in Datastore 236, until screen objects in at least 80% of the screen area have been "learned". This will be further explained below. Once this threshold about the screen knowledge is reached, Action Suggester 246 invokes Object Grouper 242 and Input Generator 240.

Before proceeding, recall that in preceding teachings we have been using the term "screen" objects to refer to the objects on the screen. This was to emphasize the fact that up until now, the functionality of the screen object is not known. The functionality is determined once the object-type of the screen object is known as will be taught below. The object-type determines whether the screen object is a dropdown, a radio button, a scrollbar, or any other type of GUI object. Since this and subsequent sections provide teachings for determining this functionality or the object-type of objects, from here onwards, we will drop the above emphasis of using "screen" before objects per earlier explanation.

Object Grouper 242 detects which objects stored by Action Suggester 246 in Action Array function together. It does this by detecting the proximity of other objects on the screen around them. It then groups these objects into functional sets such as forms, field/button combinations, etc. For example, Object Grouper 242 may detect a text input-box, and in close proximity, a button.

Based on a predetermined logic it may then group these objects together and assign them the same action_group_id in Action Array. For example, see action_group_id_grp12345-e89b-12d3-a456-426655445879 in the above exemplary population of Action Array. A number of other heuristic approaches to grouping objects may also be applied. For example, a semantic or interpretive approach to the objects and their labels may also be applied. As explained earlier, all actions having the same action_group_id are performed by Action Execution 210 of Client 202. All these actions are performed before checking page/object level thresholds and eventually sending the latest screenshot to the server side.

Note that when Object Grouper 242 creates a grouped object, the grouped object is a bigger object on the screen and gets a higher priority in the bread-first approach employed by Action Suggester 246, as explained above. Furthermore, if Action Suggester 246 knows of a page in the Application Map that is less known than the current page, or has lesser number of known objects than the current page, then it will raise the priority of the that page for picking it in subsequent iterations of its breadth-first algorithm. This guarantees convergence of the algorithm, until all the pages and all their objects have been processed.

User Training 250

User Tuning functionality 250 shown in FIG. 2 is leveraged to provide supervised machine learning of the instant design. With this capability, the user may mark certain pages and objects as higher priority. The priority/weight of an object is set in its Unique Object. Action Suggester 246 will then choose those pages and objects overriding its default breadth-first approach. Furthermore, User Tuning 250 enables the user of the system to provide feedback to the learning process.

That is because the priorities/weights of the pages and Unique Objects may be increased/decreased or even set to be ignored during runtime. An appropriate user input capability may be provided for this purpose, such as, by clicking on the object and entering of a priority/weight value by the user. For this purpose, each page of the Application Map can be displayed on a user console. Then the user can apply the priority/weight of the objects on a page. The above priorities/weights may also be configurable based on the type of the application or SUT 100.

Additionally, specific screen objects may be marked by the user to be included in or excluded from sub-screen similarity comparison as discussed. This is also where default settings for thresholds, such as page_level_threshold and object_level_threshold can be changed. Thus, module 250 enables supervised machine learning in the system, as well as techniques of dynamic thresholding. Obviously, the instant design also allows for unsupervised/automatic learning capabilities as disclosed throughout this disclosure.

Guesser 244

Guesser function/module 244 follows guessing logic to identify the type of objects on the screen detected by Object Detection 228 per earlier teachings. The guesser traverses its guessing logic utilizing results of actions performed on the object in successive iterations. It populates the actions in Action Array to be executed on the object by Client 202 as explained above. By reading the results of prior actions, it adjusts the probability of the object to be of a certain object-type.

Each object on the screens of GUI 102 is presumed to be one of available finite object-types. Exemplary values for object-type include button, input-box, checkbox, dropdown, radio button, text/label, image/icon, canvas, drag-&-drop, scrollbar, slider, hyperlink, etc. This list may also include any other object-types or widgets known in the art, and not explicitly listed above. The objective of Guesser 244 is therefore to determine which one of the above known object-types are on the screens of GUI 102 of SUT 100 of FIG. 1A and FIG. 2.

As hinted above, multiple runs/rounds of handshake between Client 202 and Server 220 may be required to fully determine an object (and its corresponding Unique Object). As such, Action Array may be sent to the server with various actions to try on an object. One of those actions may wind up SUT 100 on a different page/screen where that object may not be visible. At this point, Guesser 244 will start guessing new objects from the new page and keep guessing until it sees the previous object (and its Unique Object) again on a page. Then it will resume guessing that previous object.

The detailed logic of Guesser 244 is provided below. Each correct guess will increase the probability of the guess about an object to be correct. Therefore, in the logic below, the word likely means that the probability of the associated object gets incremented to be of the specified object-type. As will be apparent by now, these actions in the logic below are first populated in Action Array by Server 220 then executed by Client 202 and the results again gathered in Action Array to be sent to the server.

Note further, that these actions may be implemented differently on different computer technologies and operating systems, such as Microsoft Windows, Apple's Mac, Linux, etc. For example, a mouse right-click on a Windows OS is typically performed by pressing the right-click of a windows mouse while on a Mac OS it can be performed by pressing the Ctrl key while tapping on the mouse button or touchpad. The present technology is agnostic of the type of computer technology or operating system environment being employed in practicing its techniques.

Furthermore, a given implementation of the instant technology may not require all of the actions provided below. Instead, if it can be known that the application(s) that are to be tested or whose behavior is to be learned, such as SUT/application 100, only uses certain types of actions, then only those actions from the below guessing logic may need to be implemented for learning engine 200B. This knowledge may be obtained based on a user supplied input/ configuration or an Artificial Intelligence (AI) module. Such selective implementation of these actions suitable for a given type of SUT 100, significantly improves the performance of the present embodiments.

Guessing Logic:
A. Single-click, or simply click the object:
  a. If there is no change to the page or object because both object_level_threshold and page_level_threshold are not triggered, then the next check/guess in step/operation (B) below is performed.
  b. If there is a change and the area of the changed region is larger than the object area, with the coordinates of the changed region close to the click coordinates, then the object is likely a dropdown. In this case, object_level_threshold would have been triggered.
  c. If there is a change and the changed region lies within the object, then it is an interactive object. In this case, object_level_threshold would have been triggered.
  d. If the page has changed, then it is a button responding to this click action. In this case, page_level_threshold would have been triggered.
    Note that a hyperlink is considered to be a type/instance of a button, and is detected in a similar fashion. However, as opposed to a button, a confirmatory step for a hyperlink detection is carried out. This step requires an OCR detection of a text with an underline in the object. If a text with an underline is detected, then the object is treated as a hyperlink. To further improve the accuracy of hyperlink detection, system 200B also uses the font color of the detected text. If the font color is a shade of blue, for example, then this further indicates that the object is a hyperlink.
B. Detect if there is a circle in the object. If there is a circle, then click the center of the object and check to see if a new object appears in the center of the circle. This is done by computing the total count of different pixels before and after clicking in the term PixelDiff, and then using Eq. (1). If a new object does appear, then it is likely a radio button.
C. Detect if there is a square in the object. If there is a square, then click the center of the object and check to see if a new object appears in the center of the square. This is done by computing the total count of different pixels before and after clicking in the term PixelDiff, and then using Eq. (1). If a new object does appear, then it is likely a radio button.
D. Hover over the object
  a. If there is a shade change to the object, then it is likely an input-box or a button.
  b. If there is a change over a larger area in the screen, then the object is likely a menu or sub-screen.
E. Check for input-box by first typing an identifying text, e.g. "X X X X X". Then read the screen by OCR for the identifying text. If the identifying text is on the same or similar coordinates, then it is most likely an input-box. Furthermore, determine the ratio of the size of the font of the identifying text and the size of the object. If same/similar ratio is observed in the observed screen change and the size of the text read by OCR, then it is most likely an input-box.
F. Detect drag-&-drop functionality by clicking and holding down the mouse button on the object (also referred to as a mouse-down action). Then move the mouse pointer and detect a change in the type of mouse pointer. If there is a change, then it is likely a drag-&-drop functionality/object.
  A drag-&-drop functionality refers to moving of a visual object between 2 places, and includes objects such as a slider, a scrollbar, a source-to-destination drag-&-drop widget, or the like. Drag-&-drop guessing follows this logic sequence:
    a. Perform a horizontal drag on the object. If the object itself moves then it is likely a horizontal slider or a horizontal scrollbar or a source-to-destination drag-&-drop widget/object.
      i. If a region of the screen also changed during the above operation, then this indicates that the object is likely a horizontal scrollbar. In such an instance, the change will be more than page_level_threshold, for example 99%. As a result, a new screenshot will be taken by Client 202 and sent to AI Server 220.
        In an enhancement of this feature, the changed region is marked as the canvas of the scrollbar. Next, Guesser 244 updates action_to_perform field of Action Array by 'upload hidden object' action for Action Suggester 246. In response Client 202 performs a horizontal drag on the scrollbar while capturing the content of the scrollbar canvas as its own image/screenshot which is then also sent to AI Server 220.
    b. Perform a vertical drag on the object. If the object itself moves then it is likely a vertical slider or a vertical scrollbar or a source-to-destination drag-&-drop widget/object.
      i. If a region of the screen also changed during the above operation, then this indicates that the object is likely a vertical scrollbar. In such an instance, the change will be more than page_level_threshold, for example 99%. As a result, a new screenshot will be taken by Client 202 and sent to AI Server 220.

In an enhancement of this feature, the changed region is marked as the canvas of the scrollbar. Next, Guesser 244 updates action_to_perform field of Action Array by 'upload hidden object' action for Action Suggester 246. In response Client 202 performs a vertical drag on the scrollbar while capturing the content of the scrollbar canvas as its own image/screenshot which is then also sent to AI Server 220.

c. Perform a multi-directional or a diagonal drag on the object. This is accomplished by dragging a configurable number of pixels, for example 50 pixels, in the following directions from an imaginary origin at the center of the object: 45°, 135°, 225° and 315°.

i. If there is no change in any screen region during the above operation, except the movement of the object itself, then it is likely a source-to-destination drag-&-drop widget/object.

Next the object is dragged on the screen in a spiral pattern until a change in a previously known object is detected. In other words, the object is dragged spirally, or in alternative embodiments randomly, until object_level_threshold is triggered. The changed object is then marked as the destination of the drop.

Note that the above operation only records changes to other objects on the screen and not the object being dragged itself. This is obvious because the object in question is itself being dragged and therefore the triggering of object_level_threshold only should be recorded for objects other than the dragged object itself. As a result of this operation, the dragged object is detected to be the source object and the changed object is detected to be the destination object of the source-to-destination drag-&-drop functionality.

G. Detect a canvas by detecting a drawing or traces of mouse movement. Specifically, mouse-down within the object at a point that is half the length of the Width W of the object away from its center (X,Y) coordinates, that is, $(X_{center}, y_{center})-0.5\ W$. Then move the mouse pointer up to $(x_{center}, y_{center})+0.5\ W$. Then detect the contour of the object within the object area. If the contour matches the shape that was drawn, then it is a canvas.

H. Double-click the object. Repeat logic steps (A) (a) through (A) (d) above, for detecting a button or hyperlink responding to a double-click action.

I. Right-click the object. Repeat logic steps (A) (a) through (A) (d) above, for detecting a button or hyperlink responding to a right-click action.

J. Middle-click the object. Repeat logic steps (A) (a) through (A) (d) above, for detecting a button or hyperlink responding to a Middle-click action.

K. Finally, execute any pluggable object detection modules to enable users to detect any objects that are specific to the particular SUT application.

L. A non-interactive object is detected if the object does not react to any of the above actions. Such an object could be an image or icon, a label, or a disabled interactive object.

a. If such an object has a valid OCR reading, then it is detected to be a label with its OCR reading as its content/text.

b. If such an object does not have a valid OCR reading, then it is detected to be an image/Icon.

Note that in all of the steps B-K above, at least object_level_threshold would have been triggered to cause a new screenshot to be sent to Server 220 by Client 202 per above teachings.

As can be seen above, the logic of Guesser 244 generally uses a click-first principle. This is because clicking is the most likely operation to cause an application state to change resulting in traversing the SUT application as much as possible initially. If Guesser 244 continues with the guessing, then it switches to a simplest-first scheme with the objective of detecting simple objects first and then the more complex ones. Hence the ordering of above steps A-H above.

Guesser 244 also processes the results from prior executed actions on an object that are captured/stored in Action Array. These results are stored by Client 202 in actual_results and execution_status fields/members of Action Array specified above, and then sent to the server. Guesser 244 stores the likelihood percentage that a screen object is known in its corresponding Unique Object. Once the Unique Object has its object-type guessed by Guesser 244 to be above a predetermined threshold (for example 80%), then it is considered "learned". Action Suggester 246 now moves on to invoke Object Grouper 242 and Input Generator 240.

It invokes Object Grouper 242 on the object to see if it is a part of a group. It invokes Input Generator 240 to further interact with the object by supplying it the requisite input. It should be noted, that in the Inbound functionality 222, if after Object Deduplication 232, a new object were linked to a Unique Object that was already "learned", then, there would have been no need for ActionSuggester 246 to invoke Guesser 244 on it. Instead, it would check and see that the current object is already learned above the exemplary threshold of 80%, and would then directly invoke Object Grouper 242 and Input Generator 240 on the object.

By default, Guesser 244 stores all of its knowledge of an object, in its corresponding Unique Object in Datastore 236. As learning engine 200B learns the behavior of or tests SUT 100 it applies this knowledge across multiple pages. For example, for an input-box, Guesser 244 may need to perform a button and dropdown check first (Step A above), before it gets to the input-box check (Step E above). However, if the same object occurs on another page then Guesser 244 will be able to continue its guessing on that page and will suggest jumping to the next check in its logic, that is Step B. Of course, Guesser 244 will know that the screen object on the current page is the same as seen before, because both the screen objects will be linked to the same Unique Object.

It should be remarked here, that the knowledge about a screen object, such as the percentage likelihood of it having a certain object-type, is stored in its Unique Object. This likelihood is stored in the Unique Object on a per object-type basis. However, the actions are performed on the object itself. In other words, and as explained before, an object can be considered to be a specific instance of a Unique Object. While a Unique Object has a Height and Width, it does not have screen coordinates. That is because a Unique Object does not exist on the screen. It is the specific screen object that has screen coordinates and is drawn on the screen of GUI 102 and with which Action Execution 210 of Client 202 interacts.

The reader would have observed that the present learning techniques may also define intermediary states about an object without identifying a specific object-type. For example, in step (A) (c) above, an "Interactive Object" means that while it is known that the object performs a function, it has not yet been fully determined whether the function is that of an input-box, or a button, or a dropdown, etc. In other words, it has been determined that the object is actionable and is therefore not a static image, or a text/label. Note that once an object has been determined to be a label by Guesser 244, it is read via OCR and the results of the read are stored in Datastore 236 along with its Unique object.

Multi-Function Guessing:

In some applications, there may be multifunction objects. These are objects that have more than one object-type. For example, a dropdown menu may show a dropdown function upon hovering of the mouse, however upon clicking, it may take user to the main screen for that dropdown menu. In these cases, it needs to be known that the object is both a button and a hover. Similarly, right-clicking an object may produce a menu, clicking on it may produce a blinking cursor while double-clicking on it may produce a pop-up dialog box. As such, Guesser 244 would be set to guess for all types of behaviors in all objects and corresponding Unique Object data would have probability associated with multiple object-types. In the previous example, the corresponding Unique Object can store these likelihoods per object-type as: {Button: 0.99, Hover: 0.90, Label: 0.01}.

Object Label Proximity:

Label proximity is used to attach context to an object. The objective of this principle of the instant technology is to find the text closest to an object and use that as the context for Input Generator 240. For example, if an input-box is known to have the label "First Name" to its left, then Input Generator 240 will use "First Name" as the context of the input-box. It will use this context for looking up values from its input table/datatset in the datastore or for looking up the appropriate random pattern by Random Generator 248 as explained further below.

When building the above context around a screen object, the page containing the object is used to link two Unique Objects together, i.e. label "First Name" and input-box in the above example. However, it should be noted that this link is not reusable across different pages. This is because the same input-box can be on multiple pages while its context may change based on the label. In other words, and continuing with the above example, on a different page the label may be "Address" for the same input-box, thus resulting in a different context for the input-box. Therefore, the relationship between each label and input-box is considered unique. This relationship is visualized in the graph of FIG. 6.

Specifically, FIG. 6 shows that PageN at node 450 has Object1, Object2 at nodes 452, 454, corresponding to Unique Object1, Unique Object2 respectively. Object1 452 is in close proximity of 0.99 to Object2 454. This means that Object2 is a label for Object1 by a probability of 99%. In one embodiment, this probability is calculated as simply the inverse of the absolute distance between Object1 and Object2. In other words, the closer Object2 is to Object1, the higher this probability is that it is its label. The precise mathematical formulation for this calculation will be apparent to a person of ordinary skill.

Continuing with the example of FIG. 6, Guesser 244 of FIG. 2 has estimated that Unique Object1 at node 456, corresponding to Object1 at node 452, has 90% likelihood of being an input-box. Similarly, Guesser 244 has estimated that Unique Object2 at node 458, corresponding to Object1 at node 454, has 90% likelihood of being a label. The proximity relationship between the input-box and the label are then fed into Input Generator 240 of FIG. 2. Aside from this example employing an input-box, for any other object-type as well, the nearest label may be found and used to associate a context to the object.

Now let us look at the label proximity logic in detail. This logic is used to associate a label to an object of object-type input-box.

A. The input-box is first read via OCR without clicking on it. This is used to detect if there is any label on the inside of the input box.
B. The center coordinates of the left side of the input-box at X and Y screen coordinates are calculated as Center-XY={X, Y+0.5*Height}, where Height is the height of the input-box.
C. Nearest Label to Center-XY. The nearest edge of a label object is searched for using the following operations:
 a. If X coordinate of the label<X coordinate of the input box, then X coordinate of the label=X coordinate of the label+label Width.
 b. If Y coordinate of the label<Y coordinate of the input-box, then Y coordinate of the label=Y coordinate of the label+label Height.
D. The nearest label is the one with the least absolute distance between the X and Y coordinates of the label computed above in steps (C) (a) and (C) (b), and Center-XY computed above in step (B).
E. Finally, the label proximity logic can also be implemented by an external plugin module, AI based or otherwise, that may also be user supplied.

It should be noted that the above logic as well as the guessing logic and multi-function guessing are all server side operations because Unique Objects already contain the requisite information for the performance of these operations. In other words, since the requisite data required for these operations already resides in Unique Objects in Datastore 236, it is optimal to perform these operations on the server side.

Input Generator 240

As stated earlier, input Generator 240 of FIG. 2 creates the inputs that should be used for a particular object or object group. One of the objectives of Input Generator 240 is to use as much context from the page to determine the type of information required to generate input for the object or group of objects. It relies on label proximity functionality explained above for generating the contextualized input. This is also visualized in the exemplary graph of FIG. 6 where Input Generator 240 receives the proximity relationship information between the input-box and the label, and generates a contextualized suggested input 460.

Input Generator 240 passes on the label text as the context for performing lookups from its input datasets/tables 462 of predefined values as will be explained below. Additionally, a Random Generator 248 is also used to generate randomized inputs based on regular expressions (RegExp) or other logic based on the context, as will also be explained below. Input Generator 240 may employ Random Generator 248 for randomized input when no contextual or label proximity information is available, or as an additional source of input even when contextual information is available. Random Generator 248 is also visualized in FIG. 2 for completeness.

To accomplish its objectives, Input Generator 240 uses a table of possible values as well as random patterns of Random Generator 248 that correspond to the object-type of the object and the label determined to be in its proximity. The object-type determines what kind of data is generated. For example, a text string may be generated for an input object, a Boolean value for a checkbox, an integer for a radio button, and so on. The functional logic of Input Generator 240 is given below, and visualized in FIG. 7. The graph of FIG. 7 and the below logic are based on an example containing two exemplary object-types (input-box and checkbox), to facilitate explanation and to keep the expansion of the graph to a practical size. Based on the principles taught below, similar graph expansion and/or input generation logic of other GUI objects can be readily conceived by a person of ordinary skill.

- A. First, determine whether Object1 at node 500 requires an input or is an input object as shown at node 502. This check triggers this logic as Input Generator 240 is invoked by Action Suggester 246 of FIG. 2. If the check fails, control is returned to Action Suggester 246 without generating input. Otherwise, the graph of FIG. 7 branches out based on the object-type, that is, input-box (node 504), checkbox (node 506), radio button (not shown in FIG. 7), scrollbar (not shown in FIG. 7), etc.
- B. Given the object-type of the input object, determine the type of data required, i.e. string, Boolean, integer, etc.
- C. Check if the object has a label associated with it (i.e. in its proximity) or not.
    - a. If there is no label, then Random Generator 248 as shown in FIG. 2 and FIG. 6, is invoked to produce a random pattern matching the type of the input object to serve as the input generated for Object1 by Input Generator 240. Random Generator 248 in turn uses an appropriate Regular Expression (RegExp) to generate the required input. This is shown by nodes 516 and 530 for an input-box (node 504), and by nodes 532 and 536 for a checkbox (node 506).
    - b. If the object has a label then the input is randomly looked up (nodes 508, 534) from the available input datasets of predefined values, given the object-type of the input object.
        - i. If the object-type is input-box (node 504) and the label is an "Address" (node 510), then a predefined address "456 First St" (node 518) or "1234 Sesame St" (node 522), etc. is looked up from the address dataset, which may be implemented as a table in the database. Alternatively, a randomly generated Regular Expression (RegExp) value is generated (node 520) by Random Generator 248. Similarly, if the label is a "First Name" then a dataset/table of first names is looked up randomly to serve as the input generated by Input Generator 240. In the example of FIG. 6, this may be John (node 528), Jack (node 526) or a randomly generated RegExp value according to the Regular Expression for first names (node 524) produced by Random Generator 248.
        - ii. If the object-type is checkbox (node 506) and the label is "License" or "Agree" indicating that the context of the checkbox on the screen is that of a licensing agreement, or an agreement of terms and conditions, that must be checked in order to proceed in the GUI.

In such a scenario, a predefined value (node 544) from the license/agreement dataset/table is randomly looked up for the checkbox. As shown, such a predefined value should mostly return a True indicating that the checkbox should be checked most of the times in order to continue with the testing or behavior learning of SUT 100.

However, if the label has an unknown value that cannot provide context for the lookup, indicated by label "Unknown Value" at node 542, then a predefined value from a standard checkbox dataset/table is looked up. Such a lookup has an equal chance to provide a True or a False as shown by node 546.

Input Consistency for Object Groups:

If the object is a part of an object group per above explanation, then Input Generator 240 executes the above logic for all the objects in the group. In this case, the input values generated need to be consistent across the group. FIG. 7 shows an example of this in the case of Address and Zip. When a certain address value is generated by Input Generator 240 per above logic, a matching Zip code must also be generated. Otherwise an error in GUI 102 of the SUT application 100 of FIG. 1A and FIG. 2 may occur every time the corresponding fields are inconsistent.

Therefore, if an object is a part of an object group with each object having labels (e.g. Address and Zip in FIG. 7), then Input Generator 240 ensures that when it generates an input for any of the objects in the group, it is consistent with the other object(s) in the group. This is easily accomplished knowing the relationships between the objects. In the example of FIG. 7, Input Generator needs to ensure that it generates an address that is consistent with the Zip and vice versa. Such relationships between input objects for a given application will be apparent to a person of ordinary skill. Based on these relationships, the input consistency requirements in Input Generator 240 can be configured or coded using any of the techniques available in the art.

It should be noted that Input Generator module 240 plays a key role when learning engines 200, 200B of FIG. 1A and FIG. 2 respectively are used for unmanned or automated QA/testing purposes. This is because, it is here where appropriate datasets/tables as well as the required regular expressions for input may be provided, so that SUT 100 and learning engines 200, 200B may run unmanned. Note that in such an application of the instant technology, learning engines 200, 200B keep learning about SUT 100. As they traverse the various functional components of SUT 100, they detect new objects on the screens of its GUI 102. They learn about these new objects per above teachings, then move on to still other functional components with other screens and still newer objects to learn and so on.

The above unmanned testing/execution can go on until a predetermined time has passed, or the user stops the system, or still if some other predetermined criterion/criteria have been satisfied. Such predetermined criteria may include the completion of either a partial or exhaustive learning/testing of SUT 100. Of course, the above operation of the learning engines can also be supplemented with user inputs as discussed above, to provide for supervised learning and a consequent semi-automated operation.

In view of the above teaching, a person skilled in the art will recognize that the apparatus and method of invention can be embodied in many different ways in addition to those described without departing from the principles of the invention. Therefore, the scope of the invention should be judged in view of the appended claims and their legal equivalents.

What is claimed is:

1. A computer learning engine comprising at least one microprocessor executing program instructions stored in a non-transitory storage medium for learning a behavior of a computer system under test (SUT), said learning engine comprising:
   (a) an Action Array construct containing one or more screenshots of a user interface of said SUT, said at least one microprocessor configured to perform as an Application Mapping module that maintains a state transition model and identifies one or more pages of said user interface by a Sub-screen Similarity function, wherein said Sub-screen Similarity function utilizes one or more comparison masks corresponding to said one or more pages, said one or more comparison masks based on one or both of a whitelist containing a first set of one or more screen objects to be included in a comparison and a blacklist containing a second set of one or more screen objects to be excluded from said comparison, wherein said comparison is based on a computation given by: $(\text{PixelDiff}/(\text{Height}_{Page}*\text{Width}_{Page}-\text{Height}_{Excluded}*\text{Width}_{Excluded}))*100$, wherein said $\text{Height}_{Page}$ and said $\text{Width}_{Page}$ represent a height and a width respectively of said one or more pages involved in said comparison, and $\text{Height}_{Excluded}$ and $\text{Width}_{Excluded}$ represent a height and a width respectively of a total area excluded from said comparison;
   (b) one or more screen objects detected from said one or more screenshots, each of said one or more screen objects linked to a corresponding Unique Object, wherein said Unique Object contains an image of said each of said one or more screen objects, and wherein said Unique Object also stores a height and a width of said each of said one or more screen objects, and wherein said one or more screen objects belong to one of said first set of screen objects and said second said of screen objects; and
   (c) an object-type associated with each of said one or more screen objects, said one or more screen objects detected and said object-type associated without requiring any prior knowledge related to said one or more screen objects, wherein said object-type is stored in said Unique Object and identifies an interactive behavior of said each of said one or more screen objects;
   wherein said learning is based on one or more actions performed by said learning engine on said one or more screen objects in accordance with said object-type.

2. The learning engine of claim 1, wherein said learning is used in quality assurance testing of said SUT.

3. The learning engine of claim 1, wherein said object-type is selected from the group consisting of a button, an input-box, a checkbox, a dropdown, a radio button, a label, an image, a canvas, a scrollbar, a slider, a source-to-destination drag-&-drop and a hyperlink.

4. The learning engine of claim 1, wherein said one or more screen objects are detected based on determining at least one of an edge and a contour of said one or more screen objects.

5. The learning engine of claim 4, wherein said object-type is guessed in an iterative manner by a Guesser module.

6. The learning engine of claim 5, wherein one or more suggested actions are populated by said Guesser module in said Action Array construct.

7. The learning engine of claim 5, wherein one or more pages corresponding to said one or more screenshots are stored in an Application Map by an Application Mapping module.

8. The learning engine of claim 7, wherein said one or more screenshots, said Application Map, said one or more screen objects and said object-type are saved in a datastore.

9. The learning engine of claim 1, wherein an Object Grouper module performs a grouping of said one or more objects into logical groups.

10. The learning engine of claim 9, wherein said grouping is based on said object-type and a proximity of said one or more objects in relation to each other.

11. A computer-implemented method for learning a behavior of a computer system under test (SUT), said method executing program instructions by at least one microprocessor, said program instructions stored in a non-transitory storage medium, and said method comprising the steps of:
   (a) taking one or more screenshots of a user interface of said SUT and storing said one or more screenshots as corresponding one or more pages in a state transition model maintained by an Application Mapping module, wherein said at least one microprocessor is configured to perform as said Application Mapping module for identifying said one or more pages by a Sub-screen Similarity function, said Sub-screen Similarity function utilizing one or more comparison masks corresponding to said one or more pages, said one or more comparison masks based on one or both of a whitelist containing a first set of one or more screen objects to be included in a comparison and a blacklist containing a second set of one or more screen objects to be excluded from said comparison, wherein said comparison is based on a computation given by: $(\text{PixelDiff}/(\text{Height}_{Page}*\text{Width}_{Page}-\text{Height}_{Excluded}*\text{Width}_{Excluded}))*100$, wherein said $\text{Height}_{Page}$ and said $\text{Width}_{Page}$ represent a height and a width respectively of said one or more pages involved in said comparison, and $\text{Height}_{Excluded}$ and $\text{Width}_{Excluded}$ represent a height and a width respectively of a total area excluded from said comparison;
   (b) detecting one or more screen objects from said one or more screenshots and linking a Unique Object to each of said one or more screen objects, wherein said Unique Object contains an image of said each of said one or more screen objects, and wherein said Unique Object also stores a height and a width of said each of said one or more screen objects, and wherein said one or more screen objects belong to one of said first set of screen objects and said second said of screen objects; and
   (c) associating an object-type with each of said one or more screen objects, said detecting and said associating requiring no prior knowledge related to said one or more screen objects, wherein said object-type is stored in said Unique Object and identifies an interactive behavior of said each of said one or more screen objects;
   whereby said learning is based on performing at least one action on said one or more screen objects in accordance with said object-type.

12. The method of claim 11 further employing supervised and unsupervised machine learning techniques of artificial intelligence.

13. The method of claim 11 further performing quality assurance testing of said SUT in an automated fashion.

14. The method of claim 11, wherein said detecting is based on one or more operations selected from the group consisting of an edge detection, a contour detection and a plugin object detection.

15. The method of claim 14, further deduplicating said one or more screen objects after said detecting.

16. The method of claim 15, based on said learning, further updating said state transition model of said SUT.

17. The method of claim 15, further grouping said one or more screen objects into one or more logical groups based on said object-type.

18. The method of claim 15, further populating an Action Array construct with an id of said screenshot, an id of each of said one or more screen objects, and said at least one action.

19. The method of claim 18 operating under a client-server model and further communicating said Action Array construct between a Client module and a Server module of said client-server model.

20. A computer-implemented method for learning a behavior of a computer system under test (SUT), said method executing program instructions executed by at least one microprocessor, said program instructions stored in a non-transitory storage medium, and said method comprising the steps of:
  (a) taking one or more screenshots of a user interface of said SUT and storing said one or more screenshots as corresponding one or more pages in an Application Map maintained by an Application Mapping module, wherein said at least one microprocessor is configured to perform as said Application Mapping module for identifying said one or more pages by a Sub-screen Similarity function, said Sub-screen Similarity function utilizing one or more comparison masks corresponding to said one or more pages, said one or more comparison masks based on one or both of a whitelist containing a first set of screen objects to be included in a comparison and a blacklist containing a second set of screen objects to be excluded from said comparison, wherein said comparison is based on a computation given by: $(\text{PixelDiff}/(\text{Height}_{Page}*\text{Width}_{Page}-\text{Height}_{Excluded}*\text{Width}_{Excluded}))*100$), said $\text{Height}_{Page}$ and said $\text{Width}_{Page}$ representing a height and a width respectively of said one or more pages involved in said comparison, and $\text{Height}_{Excluded}$ and $\text{Width}_{Excluded}$ representing a height and a width respectively of a total area excluded from said comparison;
  (b) detecting at least one screen object on said one or more screenshots, said at least one screen object belonging to one of said first set of screen objects and said second set of screen objects;
  (c) deduplicating said at least one screen object, and linking said at least one screen object to a Unique Object, and storing in said Unique Object a height, a width and an image of said at least one screen object;
  (d) determining an object-type of said at least one screen object by repeated guessing, wherein said object-type is stored in said Unique Object and identifies an interactive behavior of said at least one screen object;
  (e) determining whether said at least one screen object belongs to a logical group;
  (f) verifying said at least one screen object;
  (g) determining a next action to be performed on said at least one screen object;
  (h) performing said next action on said at least one screen object; and
  (i) saving results from said step (h);
  whereby said steps (a) through (i) require no prior knowledge about said at least one screen object, and said steps (a) through (i) are repeated until a predetermined criterion is satisfied.

* * * * *